US012615262B2

(12) United States Patent (10) Patent No.: US 12,615,262 B2
Murray et al. (45) Date of Patent: Apr. 28, 2026

(54) MODIFYING USER ACCESS LEVELS TO COMPUTING SOFTWARE COMPUTING APPLICATIONS BASED ON DETECTED STATE CHANGES VIA INTEGRATIONS WITH THIRD-PARTY SYSTEMS

(71) Applicant: OneTrust LLC, Atlanta, GA (US)

(72) Inventors: Patrick Glenn Murray, Kula, HI (US); Carman Kwong, Coquitlam (CA); Christopher Cross, Calgary (CA)

(73) Assignee: OneTrust LLC, Atlanta, GA (US)

( * ) Notice: Subject to any disclaimer, the term of this patent is extended or adjusted under 35 U.S.C. 154(b) by 284 days.

(21) Appl. No.: 18/176,279

(22) Filed: Feb. 28, 2023

(65) Prior Publication Data

US 2024/0291824 A1     Aug. 29, 2024

(51) Int. Cl.
*H04L 9/40* (2022.01)
(52) U.S. Cl.
CPC .......... *H04L 63/105* (2013.01); *H04L 63/104* (2013.01)
(58) Field of Classification Search
CPC .... H04L 63/105; H04L 63/104; H04L 63/102
See application file for complete search history.

(56) References Cited

U.S. PATENT DOCUMENTS 10,178,081 B2 * 1/2019 Tsurumi .................. G06F 21/41
10,819,747 B1 * 10/2020 Sedky .................. H04L 63/105

| | | | |
|---|---|---|---|
| 2004/0193909 A1 * | 9/2004 | Chang ................. | G06F 21/6236 726/14 |
| 2007/0220509 A1 * | 9/2007 | Shwartz ................... | G06F 8/61 717/174 |
| 2009/0007260 A1 * | 1/2009 | Winje .................. | G06F 21/604 715/810 |
| 2010/0082679 A1 * | 4/2010 | Ekberg ............... | G06F 21/6218 707/783 |
| 2011/0162046 A1 * | 6/2011 | Forster ................... | G06F 21/41 726/4 |
| 2012/0079556 A1 * | 3/2012 | Wahl .................... | G06F 21/604 726/1 |
| 2015/0033297 A1 * | 1/2015 | Sanso .................. | H04L 63/126 726/5 |
| 2015/0200943 A1 * | 7/2015 | Pitre .................... | G06F 21/604 726/1 |
| 2017/0187536 A1 * | 6/2017 | Meriac ................. | H04L 63/166 |

(Continued)

*Primary Examiner* — Darren B Schwartz
(74) *Attorney, Agent, or Firm* — Ballard Spahr LLP

(57) ABSTRACT

Methods, systems, and non-transitory computer readable storage media are disclosed for managing user access levels to computing software applications based on user state changes detected via integration with a third-party system. Specifically, the disclosed system determines a user data object representing a user state associated with a user account in connection with a group of users of an entity by integrating with a third-party user management system. The disclosed system determines application data objects representing computing software applications that correspond to the group of users. Based on the user state, the disclosed system modifies a user access level of the user data object for a computing software application corresponding to the group of users. The disclosed system can generate a request to modify the user access level for providing to an administrator client device or automatically modify the user access level via integration with the third-party user management system.

20 Claims, 21 Drawing Sheets

(56) References Cited

U.S. PATENT DOCUMENTS

| | | | |
|---|---|---|---|
| 2017/0366547 A1* | 12/2017 | Goldfarb ................ | H04L 63/10 |
| 2018/0314845 A1* | 11/2018 | Anderson .............. | G06F 21/32 |
| 2019/0362087 A1* | 11/2019 | Ferrans ................ | H04L 63/102 |
| 2021/0117561 A1* | 4/2021 | Carroll, Jr. .......... | G06F 21/6209 |
| 2023/0179603 A1* | 6/2023 | Gopinathapai ....... | H04L 63/104 |
| | | | 726/4 |
| 2024/0012919 A1* | 1/2024 | Malden .................. | G06F 21/62 |

* cited by examiner

User Access Review Report

800

| Name | Email | Status | App Name | User Access Level | Review Date |
|------|-------|--------|----------|-------------------|-------------|
| User 1 | e1@email.com | Active | App 1 | Standard | 07/23/2022 |
| User 2 | e2@email.com | Active | App 1 | Standard | 05/24/2022 |
| User 1 | e1@email.com | Active | App 5 | Privileged | 05/01/2022 |
| User 3 | e3@email.com | Inactive | App 4 | Privileged | 08/22/2022 |
| User 4 | e4@email.com | Active | App 2 | Standard | 08/30/2022 |
| User 5 | e5@email.com | Active | App 7 | Standard | 08/01/2022 |

*Fig. 8*

Application Access

1000

1002

| Name | Status | App Owner | Last Reviewed | Action |
|------|--------|-----------|---------------|--------|
| App 1 | Active | Owner 1 | 10/31/2022 | Manage Access |
| App 2 | Active | Owner 1 | 05/19/2022 | Manage Access |
| App 3 | Active | Owner 1 | 05/10/2022 | Manage Access |
| App 4 | Active | Owner 2 | 10/31/2022 | Manage Access |
| App 5 | Active | Owner 2 | 07/02/2022 | Manage Access |
| App 6 | Active | Owner 3 | 10/04/2022 | Manage Access |

*Fig. 10*

Application 18

Owner: Owner 3  |  Last Reviewed: May 9, 200  |  MFA: Enabled

Access Requests     Current Access     Review History     About

| Name | Email | Current Status | Requested Status | Actions |
|------|-------|----------------|------------------|---------|
| Employee 6 | e6@email.com | N/A | Standard Access | Mark as Done |

1400

1402

PM Team

1600

| Name | Status | Date Added | Actions |
|------|--------|------------|---------|
| Employee 1 | Inactive | 09/09/2022 | Remove |
| Employee 3 | Active | 09/09/2022 | Remove |
| Employee 43 | Inactive | 09/09/2022 | Remove |
| Employee 18 | Inactive | 09/27/2022 | Remove |
| Employee 17 | Active | 09/27/2022 | Remove |

Determining A User Data Object Representing A User State *1902*

Detecting A Change In The User State Of The User Data Object *1904*

Determining Application Data Objects Representing Computing Software Applications Of A User Group *1906*

Modifying A User Access Level Of The User Data Object Based On The User State Of The User Data Object *1908*

MODIFYING USER ACCESS LEVELS TO COMPUTING SOFTWARE COMPUTING APPLICATIONS BASED ON DETECTED STATE CHANGES VIA INTEGRATIONS WITH THIRD-PARTY SYSTEMS

BACKGROUND

Advances in computer processing and data storage technologies have led to a significant increase in the use of computing devices to perform a large variety of operations. Specifically, many entities provide or otherwise utilize a large number of different computing software applications and application suites to store, process, and transmit data in connection with the different operations. Due to the large number of computing software applications that entities use, controlling access (e.g., authorization) to these applications is an important and often difficult process. For example, entities that handle sensitive data (e.g., proprietary data, financial data, medical data, personally identifiable information) control the security and privacy of such data by determining who has access to the data (and what level/time) and corresponding computing software applications that use the data. Additionally, many entities are subject to laws, regulations, or standards that include system requirements for handling certain types of data in specific ways for security/privacy reasons.

Many entities have a large number of users that require different levels of access to various computing software applications. Establishing user access levels for each user of an entity according to various applications can take a significant amount of time while accessing a large number of different files within a computing system. Additionally, changes to entity personnel as a result of hiring people, firing people, or otherwise modifying user roles or responsibilities can result in changes to the required application authorizations for individual users or groups of users. Accordingly, establishing and modifying user access levels for continually changing user groups and/or computing software applications while maintaining appropriate security and privacy controls for corresponding data types becomes even more challenging.

In many cases, failing to update authorization to one or more computing software applications for a user after the user leaves a particular user group/role can result in compromising certain data types and/or leaving the data vulnerable to data breaches. In additional examples, onboarding a user into a specific group of users without providing access to the correct computing software applications can result in important operations not being executed. Thus, managing user access levels based on changes to entity personnel, computing software applications (e.g., via updates), or system requirements associated with computing systems of an entity over time can experience significant technical challenges.

SUMMARY

This disclosure describes one or more embodiments of methods, non-transitory computer readable media, and systems that solve the foregoing problems (in addition to providing other benefits) by managing user access levels to computing software applications based on user state changes detected via integration with a third-party system. Specifically, the disclosed systems determine a user data object representing a user state associated with a user account in connection with a group of users of an entity by integrating with a third-party user management system. The disclosed systems determine application data objects representing computing software applications that correspond to the group of users. Based on the user state of the user data object, the disclosed systems modify a user access level of the user data object corresponding to a computing software application corresponding to the group of users. In one or more embodiments, the disclosed systems generate a request to modify the user access level for providing to an administrator client device associated with managing user access levels for the computing software application. In one or more additional embodiments, the disclosed systems automatically modify the user access level via integration with the third-party user management system. The disclosed systems thus provide efficient, flexible, and secure user access management for computing software applications.

BRIEF DESCRIPTION OF THE DRAWINGS

Various embodiments will be described and explained with additional specificity and detail through the use of the accompanying drawings.

FIG. 8 illustrates an example of a graphical user interface for displaying an access review report in accordance with one or more embodiments.

FIG. 10 illustrates an example of a graphical user interface for managing access to computing software applications in accordance with one or more embodiments.

FIG. 16 illustrates an example of a graphical user interface for managing user accounts associated with a group of users in accordance with one or more embodiments.

DETAILED DESCRIPTION

Figure 1:
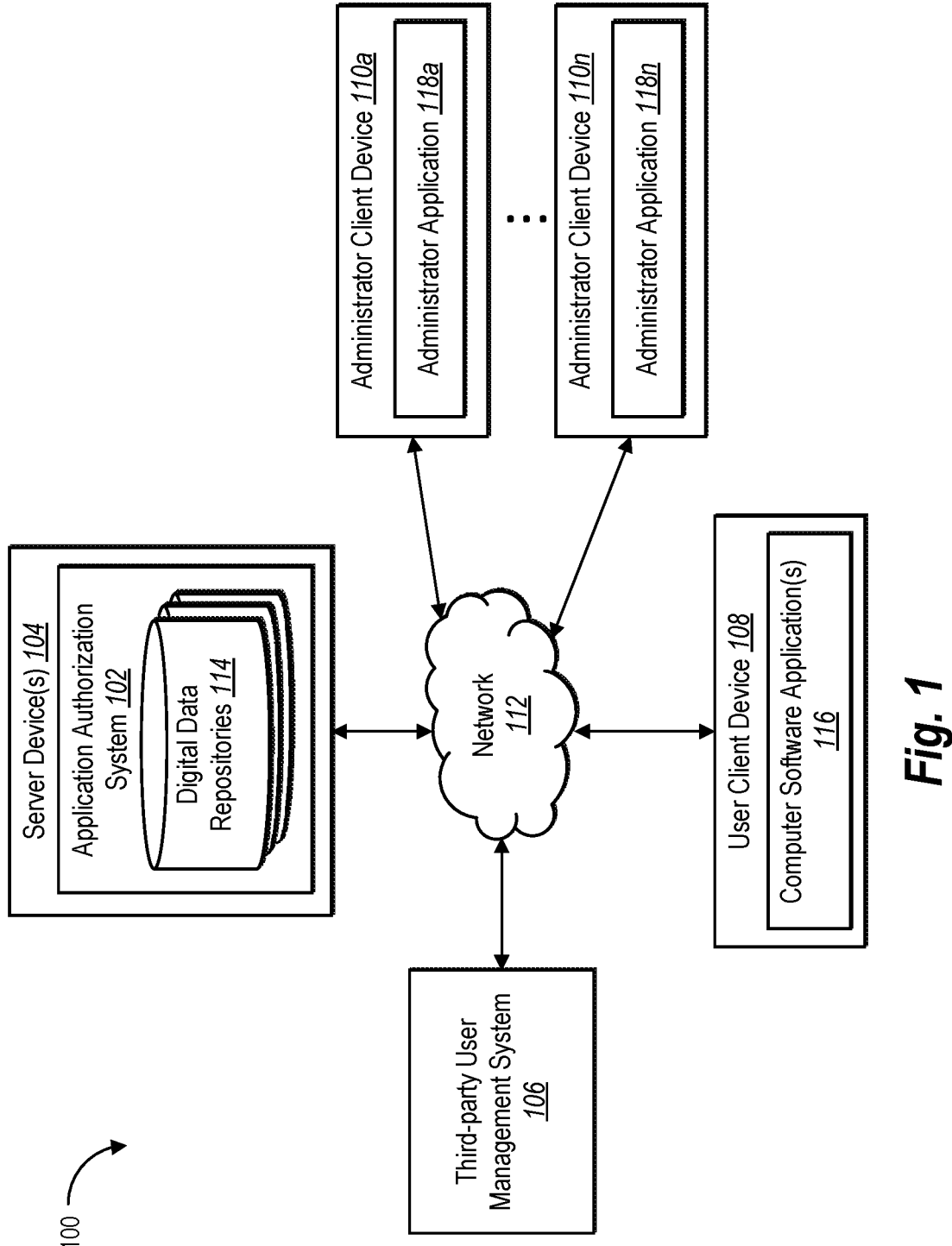
FIG. 1 illustrates an example of a system environment in which an application authorization system can operate in accordance with one or more embodiments.

This disclosure describes one or more embodiments of an application authorization system that manages user access levels for computing software applications. For example, the application authorization system manages user access levels to computing software applications associated with various user accounts according to user states or other attributes of the user accounts, including managing relationships between the user accounts and specific groups of users and corresponding sets of computing software applications. In one or more embodiments, the application authorization system determines an application stack associated with a group of users based on relationships between user accounts of an entity and computing software applications. Additionally, the application authorization system determines a relationship between a particular user account and the group of users according to a user state for the user account. Based on the user state of the user account, the application authorization system modifies a user access level of the user account for the application stack associated with the group of users. Accordingly, the application authorization system can modify user access levels for user accounts in response to changes to groups of users or roles of users for the entity.

As mentioned, in one or more embodiments, the application authorization system determines relationships between user accounts and computing software applications. Specifically, the application authorization system integrates with a third-party user management system to determine user data objects representing user data associated with user accounts of an entity. For example, the application authorization system determines, via importing and/or synchronizing data from the third-party user management system, user data objects representing user states in connection with one or more groups of users of the entity, which indicates whether a user belongs to the one or more groups of users of the entity.

The application authorization system also determines application data objects representing computing software applications. To illustrate, the application authorization system can import application data for one or more computing software applications connected to various user accounts of the entity. For example, as mentioned, the application authorization system utilizes the application data for the computing software applications to manage access by a user account to one or more computing software applications. Additionally, the application authorization system can determine groups of computing software applications (e.g., application stacks) associated with specific groups of users of the entity.

In one or more embodiments, the application authorization system utilizes the user data objects and the application data objects to determine a relationship between a particular user account and one or more computing software applications in connection with a particular group of users. For instance, the application authorization system determines whether a user state of a user data object of the user account indicates a relationship (or a change in a relationship) between the user account and the group of users. To illustrate, the application authorization system can utilize the user data object to determine whether a user is added to the group of users, removed from the group of users, or otherwise changes a role in connection with the group of users.

According to one or more embodiments, the application authorization system utilizes the user state to modify a user access level of the user data object for one or more computing software applications. In particular, in response to detecting that the user state of the user data object changes with respect to the group of users, the application authorization system determines that the user access level of the user data object should change. Thus, the application authorization system modifies the user access level to grant authorization to the user or remove authorization from the user for one or more computing software applications in an application stack for the group of users.

In one or more embodiments, the application authorization system modifies the user access level of the user data object for the computing software applications by generating one or more requests to modify the user access level. For example, the application authorization system identifies one or more administrator client devices associated with managing user access levels and provides the request(s) to the administrator client device(s). Alternatively, the application authorization system modifies the user access level of the user data object automatically in response to a detected change in the user state. To illustrate, the application authorization system utilizes an integration with the third-party user management system and/or an integration with one or more additional third-party systems to modify authorization for a user account in connection with the one or more computing software applications.

Certain embodiments described herein can improve upon shortcomings of conventional systems in relation to implementing computing systems that manage access to computing software applications. Specifically, conventional systems lack the ability to update application access to computing software applications in a timely, accurate manner in response to changes configurations of user groups of an entity. For example, as mentioned, changes to personnel, roles, etc., within a group can require that certain access rights to one or more users be given, withdrawn, or otherwise modified to maintain security and privacy of data within the group. Furthermore, changes to computing software applications (e.g., via updates) can also result in changes to access rights, requirements to re-authorize one or more users, or other operations that for confirming access to one or more computing software applications for one or more users.

Conventional systems are typically unable to quickly and easily make such determinations in real-time, which exposes data to vulnerabilities. In one example, certain laws, regulations, or standards may require that certain data be handled in a specific way. To illustrate, the computing systems may be subject to regulations associated with personally identifiable information "PII") data, Payment Card Industry ("PCI") standards, the Health Insurance Portability and Accountability Act ("HIPAA"), Fair Credit Reporting Act ("FCRA"), etc. Accordingly, compliance with such laws, regulations, or standards can include systems requirements that include granting authorization, revoking authorization, or providing specific access levels to the correct users. When a user's role changes relative to the entity, promptly and accurately managing the user's access to such data via corresponding computing software applications is an important aspect of compliance with such laws, etc. Thus, conventional systems that do not track user access levels for computing software applications in a timely and accurate manner can result in security/privacy issues (e.g., data breaches due to a terminated user having access to a computing software application for a time after termination).

Furthermore, the conventional systems also lack efficiency and accuracy in managing user access to computing software applications. Specifically, because conventional systems typically require one or more users to monitor access to individual computing software applications, the conventional systems may inadvertently provide authorization to the wrong computing software applications for a given user. Similarly, the conventional systems can fail to revoke authorization to computing software applications due to human errors during the authorization process or based on erroneous authorization records. Thus, as indicated above, the conventional systems often provide access management that results in insecure data.

Certain embodiments of the disclosed application authorization system provide advantages over these conventional systems. For example, the application authorization system provides improved security for computing systems that manage access to computing software applications. Specifically, in contrast to conventional systems that lack the ability to track authorization for computing software applications, the application authorization system provides regular and automatic monitoring of user access levels for any number of computing software applications across any number of user groups of an entity. More specifically, by integrating with a third-party user management system to frequently and regularly synchronize or otherwise obtain data identifying a set of users and their corresponding positions, roles, or associations respective to an entity, the application authorization system can manage user access levels to computing software applications in real-time.

Additionally, the application authorization system leverages integrations with one or more third-party user management systems to identify relationships between groups of users and computing software applications. In particular, the application authorization system can utilize synchronized information from the third-party user management system(s) to determine whether to provide access to one or more computing software applications in a group of computing software applications for a particular user account. To illustrate, by determining a user state associated with a user with respect to one or more groups of users and relationships between the group of users and specific computing software applications, the application authorization system can determine that the user's account should have access to the computing software applications (or revoke access to the computing software applications) based on a change in the user state. Accordingly, the application authorization system can generate mappings between user accounts and computing software applications based on the identified relationships.

Furthermore, the application authorization system provides improved security and efficiency of computing systems managing access to computing software applications by automatically modifying user access levels based on changes within an entity. For instance, in response to determining that a user access level associated with a particular user account should be changed (e.g., authorization granted or revoked), the application authorization system can modify the corresponding user access level via an integration with one or more third-party systems. To illustrate, the application authorization system can communicate with the third-party systems to automatically modify user access levels (e.g., by automatically modifying files that determine authorization for user accounts) or generate requests to provide to administrator client devices for modifying the user access levels (e.g., by automatically notifying application administrators in respect to detecting user state changes).

Additionally, the application authorization system can provide improved access controls to administrators via graphical user interfaces that consolidate access level information for a set of different computing software applications. Specifically, by integrating with one or more third-party systems to obtain data associated with users of an entity and determining access rights to a set of computing software applications, the application authorization system can combine the information for viewing within a limited number of graphical user interfaces. Furthermore, the application authorization system eliminates the need for administrator client devices to access separate application access interfaces (e.g., via a file browser, web browser, FTP link, application interface) to view or otherwise manage user access levels. Rather, the application authorization system provides management of user access levels of a variety of computing software applications for a variety of different groups of users from within a single graphical user interface (or a limited set of graphical user interfaces).

The application authorization system can also provide improved documentation compliance via access controls for computing software applications. In particular, the application authorization system can utilize automated management of access permissions to various computing software applications (e.g., software-as-a-service applications) and cloud computing infrastructure to maintain compliance with privacy and security requirements—and document such compliance—for growing/changing information security and privacy frameworks. In contrast to conventional systems involved in primary authentication and single-sign-on services that do not provide sufficient evidence to satisfy the requirements of third-party systems/auditors and/or application portfolio management systems, the application authorization system can provide real-time compliance with various frameworks and evidence-based documentation by leveraging links between evidence data objects, user data objects, and application data objects. Thus, the application authorization system can provide efficient and accurate access management for computing software applications in accordance with user state changes and/or framework changes.

Turning now to the figures, FIG. 1 includes an embodiment of a system environment 100 in which an application authorization system 102 is implemented. In particular, the system environment 100 includes server device(s) 104, a third-party user management system 106, a user client device 108, and a set of administrator client devices 110a-110n in communication via a network 112. Moreover, as shown, the application authorization system 102 includes digital data repositories 114. Additionally, the user client device 108 includes computing software application(s) 116, and the administrator client devices 110a-110n include administrator applications 118a-118n.

As shown in FIG. 1, in one or more embodiments, the server device(s) 104 include or hose the application authorization system 102. Specifically, the application authorization system 102 includes, or is part of, one or more systems that process digital data from the digital data repositories 114 and/or one or more third-party computing systems (e.g., the third-party user management system 106). For example, the application authorization system 102 provides tools to the administrator client devices 110a-110n for viewing and/or managing information associated with operations of an entity. In one or more embodiments, the application authorization system 102 provides tools to the administrator client devices 110a-110n via the administrator applications 118a-118n for managing access to computing software applications involved in the operations of the entity. To illustrate, the application authorization system 102 provides tools to the administrator client devices 110a-110n for managing access to the computer software application(s) 116 at the user client device 108.

As used herein, the term "computing software application" refers to computer package for performing a set of computer functions. For example, a computing software application includes one or more graphical user interfaces for displaying information associated with a set of computer functions performed by the computing software application. Additionally, a computing software application can include tools for directing execution of one or more of the computer functions (e.g., in response to user input via a computing device). In some embodiments, a computing software application includes a set of computer functions for performing without requiring user interactions, such as via scheduled processes or processes that execute in response to communications with one or more other computing software applications.

In one or more embodiments, the application authorization system 102 manages user access levels of user accounts for computing software applications. In particular, the application authorization system 102 communicates with the third-party user management system 106 to obtain information associated with the user accounts. Furthermore, the application authorization system 102 obtains information associated with computing software applications, such as by communicating with the administrator client devices 110a-110n and/or one or more third-party systems. The application authorization system 102 utilizes the information associated with the user accounts and computing software applications (e.g., via respective data objects) to manage user access levels for a particular user account in connection with computing software applications, including determining whether to modify a user access level for the particular user account in connection with a specific computing software application. In some embodiments, the application authorization system 102 modifies the user access level by communicating with one or more of the administrator client devices 110a-110n and/or the third-party user management system 106 (or another third-party system), thereby enabling or disabling access to one or more portions of a computing software application at the user client device 108.

As used herein, the term "data object" refers to a digital object for tracking or managing systems, software, data sources, computing software applications, user accounts, entities, or other functions or infrastructure associated with an entity. For example, a data object can could include a digital representation of the entity itself, a sub-entity such as subsidiary of the entity, a business unit of the entity, a data asset, or a data processing operation. As used herein, the term "application data object" refers to a digital object for tracking or managing a computing software application associated with an entity. Accordingly, an application data object represents a particular computing software application (e.g., from the computing software application(s) 116), including additional data associated with the computing software application including, but not limited to, an application identifier or possible access levels for the computing software application. As used herein, the term "user data object" refers to a digital object for tracking or managing user accounts associated with an entity. For example, a user data object represents a particular user account and a user state of the user account relative to an entity. To illustrate, a user state represents a relationship between a user associated with the user account and the entity (e.g., whether the user is employed by the entity or authorized to perform certain functions with respect to the entity) and/or a relationship between the user associated with the user account one or more other users or groups corresponding to the entity (e.g., whether a user belongs to a human resources group, an engineering group, a management group, or whether the user has been recently hired or fired).

As used herein, the term "user access level" refers to access privileges or authorization for accessing a computing software application. Specifically, a user access level is associated with a user account for accessing a particular computing software application. Accordingly, as illustrated in FIG. 1, a user account associated with the user client device 108 has a user access level for each of the computing software application(s) 116 indicating whether the user account can access and/or otherwise use the computing software application(s) 116. In one or more embodiments, a user access level also indicates an extent of authorization by a user account for a computing software application, such as indicating a specific subset of tools or operations associated with the computing software application. Thus, user accounts may have different user access levels for accessing different portions of the computing software application.

In one or more embodiments, the application authorization system 102 communicates with a client device to provide information associated with managing user access levels to computing software applications for an entity. To illustrate, the application authorization system 102 communicates with an administrator client device (e.g., the administrator client device 110a) to provide information associated with one or more computing software applications, one or more user accounts, and/or one or more groups of users. Specifically, the application authorization system 102 can provide summaries of application authorizations, user accounts, or groups of users associated with an entity, as well as tools for modifying corresponding data.

In one or more embodiments, the third-party user management system 106 includes one or more server devices, individual client devices, or other computing devices associated with one or more entities. For instance, the third-party user management system 106 includes one or more computing devices for tracking user account information. In additional or alternative embodiments, the third-party user management system 106 includes one or more computing devices for tracking computing software application information. To illustrate, the third-party user management system 106 can include one or more server devices for a single sign-on service that manage user account data (e.g., logins, credentials, roles) for a set of employees of an entity.

In one or more embodiments, the server device(s) 104, the user client device 108, and/or the administrator client devices 110*a*-110*n* include a variety of computing devices, including those described below with reference to FIG. 20. For example, the server device(s) 104 includes one or more servers for storing and processing data associated with application access management. In some embodiments, the server device(s) 104 also include a set of computing devices in communication with each other, such as in a distributed storage environment. In some embodiments, the server device(s) 104 include a content server. The server device(s) 104 also optionally includes an application server, a communication server, a web-hosting server, a social networking server, a digital content campaign server, or a digital communication management server.

In addition, as shown in FIG. 1, the system environment 100 includes the user client device 108 and the administrator client devices 110*a*-110*n*. In one or more embodiments, each of the user client device 108 and the administrator client devices 110*a*-110*n* includes, but is not limited to, a desktop, a mobile device (e.g., smartphone or tablet), or a laptop including those explained below with reference to FIG. 20. Furthermore, although not shown in FIG. 1, each of the user client device 108 and the administrator client devices 110*a*-110*n* can be operated by a user (e.g., a user included in, or associated with, the system environment 100) to perform a variety of functions. In particular, the user client device 108 performs functions such as, but not limited to, accessing, viewing, and interacting with data associated with an entity (e.g., via the computing software application(s) 116 or the administrator applications 118*a*-118*n*) and/or managing application access. In some embodiments, the user client device 108 and the administrator client devices 110*a*-110*n* also perform functions for generating, capturing, or accessing data to provide to the application authorization system 102 in connection with managing access to computing software applications. For example, the user client device 108 and/or the administrator client devices 110*a*-110*n* communicate with the server device(s) 104 via the network 112 to provide information (e.g., a user state of a user account or computing software applications accessed by one or more user accounts) associated with user data objects or application data objects. Although FIG. 1 illustrates the system environment 100 with a single user client device, in some embodiments, the system environment 100 includes a different number of user client devices. In some embodiments, the third-party user management system 106 and/or another system host the digital data repositories 114 or separate digital data repositories.

Additionally, as shown in FIG. 1, the system environment 100 includes the network 112. The network 112 enables communication between components of the system environment 100. In one or more embodiments, the network 112 may include the Internet or World Wide Web. Additionally, the network 112 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104, the third-party user management system 106, the user client device 108, and the administrator client devices 110*a*-110*n* communicate via the network using one or more communication platforms and technologies suitable for transporting data and/or communication signals, including any known communication technologies, devices, media, and protocols supportive of data communications, examples of which are described with reference to FIG. 20.

Although FIG. 1 illustrates the server device(s) 104, the third-party user management system 106, the user client device 108, and the administrator client devices 110*a*-110*n* communicating via the network 112, in alternative embodiments, the various components of the system environment 100 communicate and/or interact via other methods (e.g., the server device(s) 104, the third-party user management system 106, the user client device 108, and the administrator client devices 110*a*-110*n* can communicate directly). Furthermore, although FIG. 1 illustrates the application authorization system 102 and the digital data repositories 114 being implemented together within the server device(s) 104, the application authorization system 102 and the digital data repositories 114 can alternatively be implemented, in whole or in part, separately within the system environment 100. Additionally, in some embodiments, the third-party user management system 106 can include one or more administrator client devices. In some embodiments, the application authorization system 102 can be executed on a server system that provides a multi-tenant environment. The multi-tenant environment can include a tenant (e.g., one or more user accounts sharing common privileges with respect to an application instance) accessible by a particular set of client devices, as well as other tenants inaccessible to that set of client devices (e.g., access controlled to permit only access from other sets of client devices). For instance, in the tenant accessible by a particular client system of one or more client devices, certain data objects used by the application authorization system 102 may only be available to that client system (e.g., the data objects representing user accounts or computing software applications of the entity using the client system), with other tenants having other sets of data objects, and instances of the software components of the application authorization system 102 described herein may only be available to the client system, with other tenants having access other instances of these software components. In additional or alternative embodiments, the application authorization system 102 can be implemented on one or more computing systems operated by a single entity. For instance, the application authorization system 102 can be operated on a first server system controlled by the entity (e.g., via an on-premises installation of software components described herein), and can communicate with a second server system that is a client system controlled by the entity.

In some embodiments, the server device(s) 104 support the application authorization system 102 on one of the administrator client devices 110*a*-110*n*. For instance, the server device(s) 104 generates/maintains the application authorization system 102 and/or one or more components of the application authorization system 102 for the administrator client device 110*a*. The server device(s) 104 provides the generated application authorization system 102 to the administrator client device 110*a* (e.g., as a software application/suite). In other words, the administrator client device 110a obtains (e.g., downloads) the application authorization system 102 from the server device(s) 104. At this point, the administrator client device 110a is able to utilize the application authorization system 102 to manage application access by communicating with the third-party user management system 106 independently from the server device(s) 104.

In alternative embodiments, the application authorization system 102 includes a web hosting application that allows the administrator client devices 110a-110n to interact with content and services hosted on the server device(s) 104. To illustrate, in one or more embodiments, the administrator client devices 110a-110n access a web page supported by the server device(s) 104. The administrator client devices 110a-110n provide input to the server device(s) 104 to perform application access management operations, and, in response, the application authorization system 102 on the server device(s) 104 performs operations to view/manage data associated with application access management. The server device(s) 104 provide the output or results of the operations to the administrator client devices 110a-110n.

Figure 2:
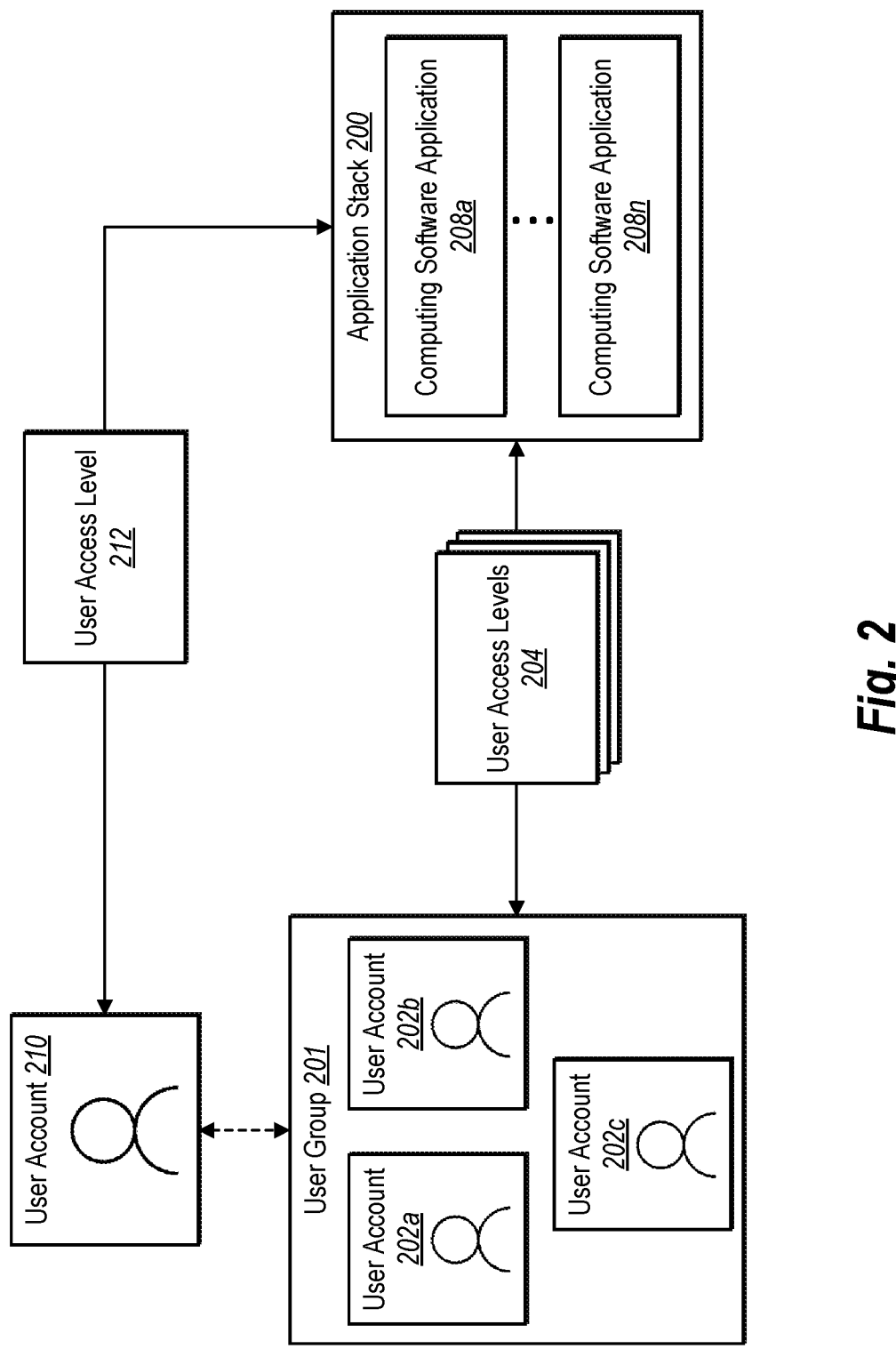
FIG. 2 illustrates user access levels for a user account and a user group in in connection with an application stack in accordance with one or more embodiments.

As mentioned, the application authorization system 102 utilizes user data objects and application data objects to provide application access management for a set of user accounts in connection with a set of computing software applications. FIG. 2 illustrates an example of a set of user accounts with various levels of access to a set of computing software applications. For example, FIG. 2 illustrates that access to a set of computing software applications depends on relationships between user accounts.

As illustrated in FIG. 2, a group of users (i.e., user group 201) corresponds to user accounts 202a-202c associated with users of an entity. In one or more embodiments, the user group 201 includes users of an entity that have a shared characteristic. For instance, the shared characteristic can indicate users who are part of the same team/organization/department within the entity, such as users who belong to the human resources department, a product management team, an engineering department, an accounting department, or a sub-group within a larger group (e.g., a specific engineering team), etc. Additionally, the shared characteristic can indicate users who have the same role within an entity (e.g., the same or similar job descriptions) across the same or different teams/organizations/departments, such as users who are entry-level employees, managers, senior managers, etc.

Additionally, as illustrated in FIG. 2, the user accounts 202a-202c in the user group 201 each have user access levels indicating specific authorizations to an application stack 200 (e.g., a particular subset of computing software applications). To illustrate, the application stack 200 includes a set of computing software applications 208a-208n for performing various operations associated with the entity. For example, the application stack 200 includes an identified set of computing software applications to which each of the user accounts 202a-202c in the user group 201 has access. More specifically, each of the user accounts 202a-202c has access to each of the computing software applications 208a-208n (e.g., indicated by user access levels 204). Accordingly, in one or more embodiments, the application stack 200 includes computing software applications that the user accounts 202a-202c have in common.

In one or more embodiments, the application authorization system 102 generates mappings between the user accounts 202a-202c and the computing software applications 208a-208n. As used herein, the term "mapping" refers to a stored link between two separate data objects. For example, the application authorization system 102 generates a mapping between a given user account (e.g., user account 202a) and a computing software application (e.g., computing software application 208a) by storing linking data that connects a user data object and an application data object corresponding to the user account and the computing software application, respectively. In some embodiments, the linking data includes a database entry that includes a user account identifier for the user account and an application identifier for the computing software application.

FIG. 2 also illustrates an additional user account 210 associated with the entity of the user group 201. For instance, the additional user account 210 can be a user account of a user associated with one or more groups including the user group 201. To illustrate, the entity may associate the additional user account 210 with the user group 201 in response to hiring the user for inclusion in the user group 201. Alternatively, the entity may remove an association of the additional user account 210 with the user group 201 in response to removing the user from the user group 201. In additional examples, the entity may change a role of the user (e.g., during onboarding or offboarding of the user), which also modifies a shared characteristic of the additional user account 210 relative to the user group 201.

In one or more embodiments, a relationship of the additional user account 210 relative to the user group 201 dictates a user access level 212 of the additional user account 210 for the application stack 200. Specifically, based on the additional user account 210 being associated with the user group 201, the user access level 212 of the additional user account 210 relative to the application stack 200 may be the same as the user access levels 204 of the user accounts 202a-202c of the user group 201. In another example, based on association of the additional user account 210 relative to the user group 201 being removed, the user access level 212 of the additional user account 210 may also change relative to the application stack 200. Thus, the application authorization system 102 can manage user access levels to computing software applications for the additional user account 210 including managing the user access level 212 to the application stack 200.

Accordingly, the application authorization system 102 can determine user access levels for a set of user accounts based on relationships between a user account and other user accounts and/or based on relationships between user accounts and one or more computing software applications. For example, as the application authorization system 102 detects changes in user states of users relative to one or more user groups of an entity, the application authorization system 102 can modify one or more user access levels of corresponding user accounts. More specifically, the application authorization system 102 utilizes user data objects representing user accounts (and corresponding user states) to detect changes in the user states of users relative to an entity. Additionally, the application authorization system 102 leverages relationships between user data objects and application data objects to determine whether (and how) to modify user access levels of user accounts for computing software applications. Furthermore, in some embodiments, the application authorization system 102 assists in modifying the user access levels of the user accounts, such as by providing information and tools to one or more administrator client devices and/or by automatically modifying the user access levels.

Figure 3:
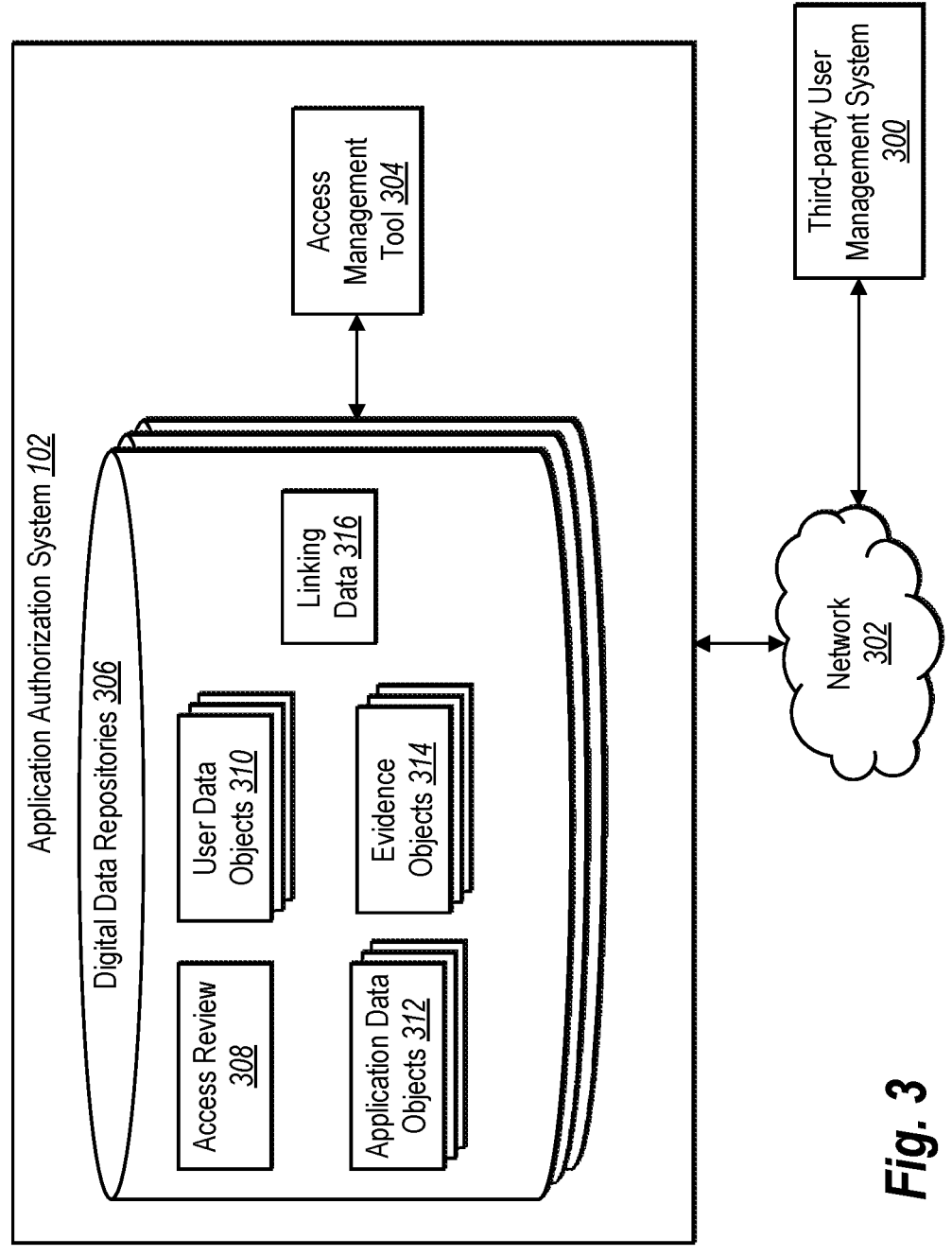
FIG. 3 illustrates an example of an overview of the application authorization system for performing user access management via integration with a third-party user management system in accordance with one or more embodiments.

FIG. 3 illustrates an example of an environment in which the application authorization system 102 determines whether to modify user access levels of a user account during onboarding or offboarding of a user relative to an entity. Specifically, FIG. 3 illustrates that the application authorization system 102 communicates with a third-party user management system 300 (e.g., one or more computing devices associated with or otherwise in communication with computing devices of the entity) via a network 302 to provide application access management in connection with a set of user accounts and a set of computing software applications. For example, the third-party user management system 300 includes computing devices that provide user account management for an entity, such as by storing information about users associated with the entity, including user identifiers, positions or roles of users, or team/organization/department information for users. As mentioned, the third-party user management system 300 can provide a single sign-on service that obtains the information about the users of the entity via one or more separate accounts connected to one or more third-party systems and/or one or more services for the users.

Additionally, as illustrated, the application authorization system 102 includes an access management tool 304 for performing one or more operations for facilitating changes in the software applications to which a user has access, such as during onboarding or offboarding of a user in connection with the entity. To illustrate, the application authorization system 102 utilizes the access management tool 304 to generate, delete, or otherwise modify user data associated with users of the entity based on information received from the third-party user management system 300. In one or more embodiments, the access management tool 304 communicates with the third-party user management system 300 to import relevant user data by integrating with the third-party user management system 300. An integration between software applications and/or computing systems can include one or more software components that permit the software applications or computing systems to communicate, such as an application programming interface ("API"), a script, an executable, or other software program. For example, the access management tool 304 can use an integration such as API for communication with the third-party user management system 300, to synchronize user data from the third-party user management system 300 at scheduled times or predetermined intervals. The access management tool 304 can also import data from one or more additional sources, such as from an uploaded file (e.g., a spreadsheet).

In one or more embodiments, as illustrated in FIG. 3, the access management tool 304 communicates with the third-party user management system 300 to import data associated with users and stores the data in digital data repositories 306. For example, the access management tool 304 synchronizes user state information from the third-party user management system 300 to match at least some portion of information in the digital data repositories 306 with data from the third-party user management system 300. To illustrate, the access management tool 304 obtains regularly scheduled updates regarding user states of user accounts of the entity in connection with managing user access levels of the user accounts to computing software applications.

As illustrated in FIG. 3, the application authorization system 102 includes a set of digital data repositories 306. In particular, the digital data repositories 306 include data associated with one or more entities. To illustrate, a first digital data repository of the digital data repositories 306 includes data associated with a first entity, a second digital data repository of the digital data repositories 306 includes data associated with a second entity, etc. Alternatively, the digital data repositories 306 store different data types within each digital data repository. Accordingly, a single digital data repository may store a first type of data associated with a set of different entities. Furthermore, the digital data repositories 306 may store data for a single entity across a set of digital data repositories.

In one or more embodiments, the digital data repositories 306 store data associated with application access management. In the example depicted in FIG. 3, the digital data repositories 306 store information associated with performing access reviews for a set of computing software applications and a set of user accounts of one or more entities. Specifically, as illustrated, the digital data repositories 306 include an access review 308, user data objects 310, application data objects 312, evidence objects 314, and linking data 316. To illustrate, the application authorization system 102 determines the user data objects 310, application data objects 312, evidence objects 314, and linking data 316 in connection with the access review by communicating with the third-party user management system 300 via an integration with the third-party user management system 300.

In one or more embodiments, the access review 308 includes a digital representation of a set of operations to assess authorization to access one or more portions of computing software applications in one or more application stacks for a user account. For example, an access review includes one or more computing instructions specifying parameters for determining application access by one or more user accounts relative to one or more computing software applications. In some embodiments, the access review 308 includes one or more files stored in the digital data repositories 306 to perform the application access management operations. In particular, the application authorization system 102 executes the operations by utilizing the access management tool 304 to determine whether to modify user access levels of the user data objects according to user states determined via the third-party user management system 300. To illustrate, FIGS. 4A-4B below illustrate embodiments of an access review including operations to determine whether to modify one or more user access levels of a user account according to various data objects and evidence objects.

According to one or more embodiments, the digital data repositories 306 include the user data objects 310 associated with user accounts of the entity. In particular, the user data objects 310 include identifying information associated with users of the entity, roles/positions of the users within the entity (e.g., user states relative to the entity), user access levels (e.g., current user access levels, previous access levels), and/or associations with one or more other user accounts or user groups (e.g., teams/organizations/departments). For example, a user data object represents a user state of a user within an entity such that the application authorization system 102 can determine whether the user belongs to a specific group of users (e.g., the human resources department).

In additional embodiments, the digital data repositories 306 include the application data objects 312 associated with computing software applications. Specifically, the application data objects 312 include identifying information associated with computing software applications, application types, types of access levels associated with each computing software application, operation data associated with the computing software applications (e.g., tools provided by each application), and/or associations between the computing software applications and specific user groups. For instance, an application data object represents a specific computing software application, the application type of the computing software application (e.g., accounting application, medical information application), and whether the computing software application includes more than one access level. The application authorization system 102 can import the application data for application data objects via integration with the third-party user management system 300 and/or from another source (e.g., an uploaded file such as a spreadsheet).

In one or more embodiments, the digital data repositories include evidence objects 314 in connection with determining whether user data objects are correctly authorized for corresponding application data objects. An evidence object is a data object used by the application authorization system 102 to track collection of evidence that user access levels are correct in connection with an access review. For instance, an access review may require that each user data object has the correct user access levels for the corresponding application data objects in connection with corresponding user states based on collected evidence. Accordingly, an evidence object indicate whether the application authorization system 102 has performed an access review according to a specified time frame and/or for the corresponding user data objects and application data objects. Thus, the evidence objects 314 represent rules and collected evidence for an access review—such as a set of rules indicating that only user accounts that are associated with specific groups of users have access to one or more computing software applications in an application stack.

An illustrative example of an evidence object is described in Table 1 below, though the application authorization system 102 may utilize other implementations of an evidence object.

In some embodiment, an evidence object can also include one or more attributes storing integration data. The integration data can include information used by the application authorization system 102 to query the third-party user management system 300 or other third-party system, software application, or data source for evidence. Examples of attributes storing integration data include an identifier of a data source, credentials for accessing the data source, query parameters used to search the data source for relevant evidence, etc.

The application authorization system 102 can re-use (or "share") evidence objects 307 across multiple controls and/or multiple access reviews. For instance, the application authorization system 102 can access, from the digital data repositories 306 or the third-party user management system 300, linking data 316 that identifies relationships (or "links") among specific data objects and/or evidence task classes. In some embodiments, a database or other data structure could include records of these links between evidence task classes and/or data objects. The application authorization system 102 can use the linking data 316 linking evidence task classes and data objects to determine that a user data object is correctly or incorrectly associated with an application data object.

In some embodiments, the application authorization system 102 can use, in an access review, a particular evidence object that was instantiated for a prior access review. For instance, as discussed herein, the application authorization system 102 can update the current access review to identify data objects associated with the access review. The application authorization system 102 can automatically assess

TABLE 1

| Attribute | Description |
|---|---|
| Evidence_Task_Class | An identifier for tracking a particular type of evidence task within the application authorization system 102, which can be used to link evidence tasks to multiple data objects. In the additional example below, a simplified identifier (e.g., "ET_1") is used for illustrative purposes. |
| Evidence_Task_Name | A user-facing Evidence_Task_Name, such as "role based access needs," that could be presented to an end user via a suitable interface. |
| Evidence_Description | A user-facing narrative description, such as the type of documentation to be collected and explanatory examples of the documentation, that could be presented to an end user via a suitable interface. |
| Evidence_Object_Identifier | An identifier for tracking a particular instance of the data object within the application authorization system 102. For instance, an Evidence_Object_Identifier could be a UUID (e.g., "123e4567-e89b-12d3-a456-426614174000"). |
| Collection_Date | Data identifying a date on which the documentation was collected. This attribute would have an empty or null value if, for example, no documentation has been uploaded or otherwise retrieved for the evidence task represented by the evidence object. |
| Evidence_Type | Indicates whether the evidence is a link, a file, or a note. |
| Evidence_Location | If the evidence is a file, this could be a pointer, address, or other identifier of a location in a data source with documentation. For instance, if a document is uploaded as evidence for the evidence task, the document itself may be stored in a database. The evidence task can identify the location of the document within that database. |
| Evidence_Task_Status | State or description indicating whether the evidence has been collected. For instance, if the Evidence_Location is empty (i.e., no evidence has been collected) or the Collection_Date is outside the observation period specified in a compliance initiative. | whether user states represented by the user data objects, as an example, indicate the correct relationships with corresponding application data objects using a data source storing "shared" evidence objects (e.g., evidence objects accessible to multiple access reviews). To illustrate, the application authorization system 102 can initiate access reviews for different groups of users. If the groups of users have overlap in users and/or computing software applications, the access reviews may correspond to evidence objects with relevant information for the access reviews (i.e., shared evidence objects). The application authorization system 102 can thus utilize the shared evidence objects in connection with one or more of the access reviews.

By generating evidence objects in connection with evidence tasks for access reviews, the application authorization system 102 can maintain proper compliance and compliance documentation for approving, revoking, and monitoring user access levels for user accounts in connection with computing software applications. Specifically, in addition to automatically managing (e.g., modifying) user access levels for computing software applications, the application authorization system 102 utilizes evidence objects to provide easily accessible data and documentation related to the management of user access levels. Additionally, the application authorization system 102 can provide access to the evidence data objects (including the respective documentation) to one or more third-party systems in connection with auditing compliance of an entity with information security and privacy requirements of one or more regulatory frameworks.

Figure 4A:
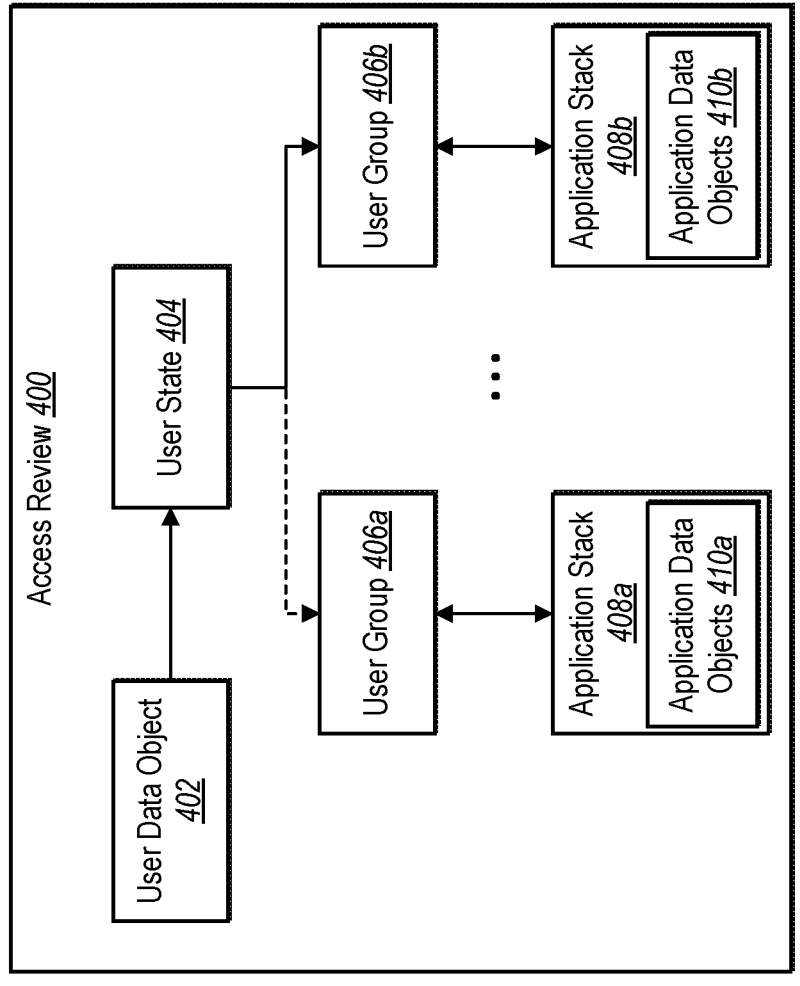
FIG. 4A illustrates an example of an overview of an access review for a user data object in connection with application stacks in accordance with one or more embodiments.
Figure 4B:
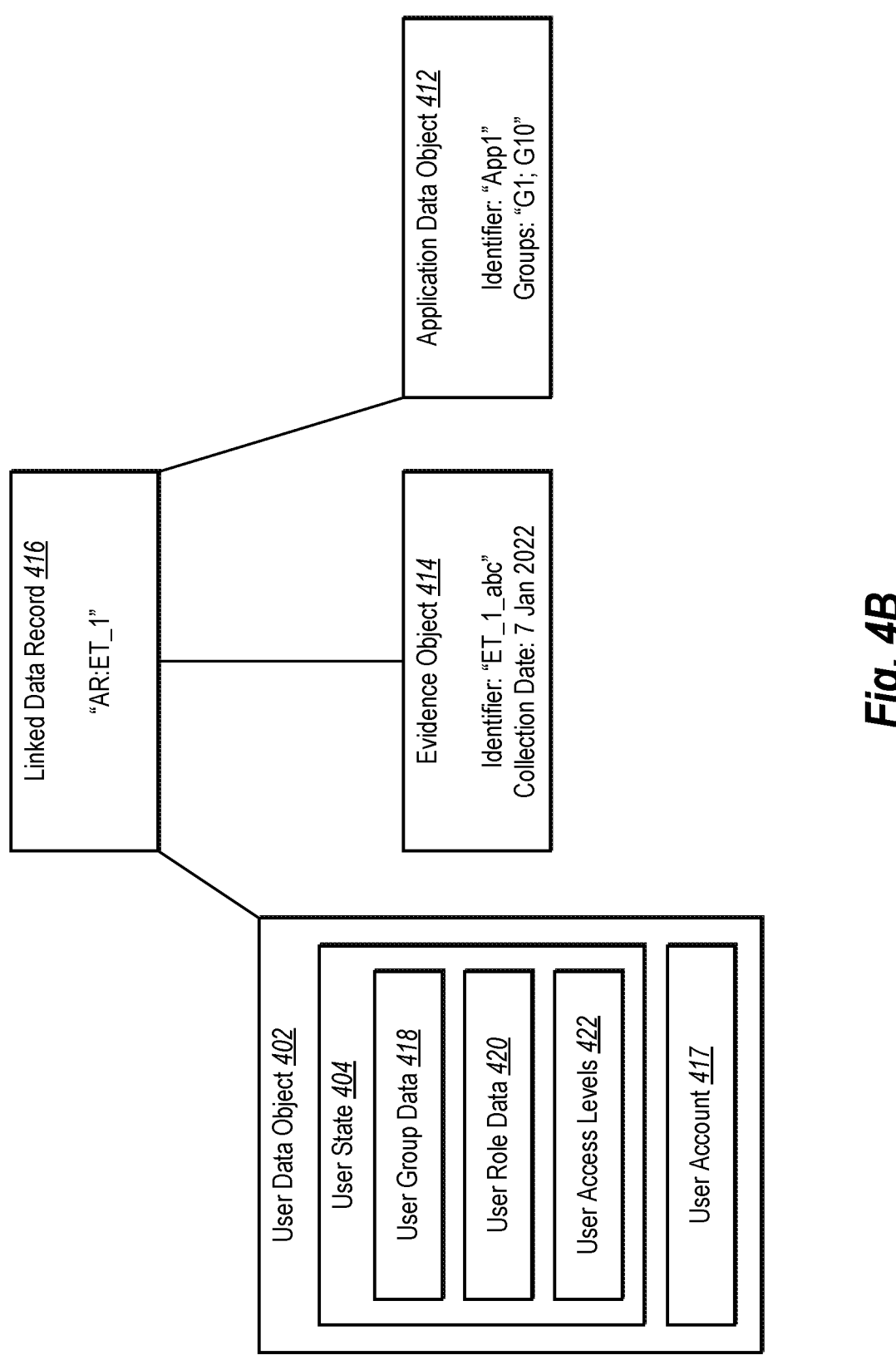
FIG. 4B illustrates an example of relationships between a user data object, an evidence object, and an application data object during the access review of FIG. 4A in accordance with on or more embodiments.

FIGS. 4A-4B illustrate example embodiments of the application authorization system 102 performing an access review 400. Specifically, FIG. 4A illustrates that the application authorization system 102 performs the access review 400 in response to a user state change corresponding to a user data object. For example, as illustrated, the access review 400 includes a determination that a user data object 402 represents a user state 404 for a user (e.g., based on a role or position of the user relative to an entity). To illustrate, the application authorization system 102 detects a change in the user state 404 of the user data object 402 during the access review 400 in response to communicating with a third-party user management system.

In one or more embodiments, as illustrated in FIG. 4A, the access review 400 includes the application authorization system 102 determining that the user state 404 changes to indicate that the user data object 402 is no longer associated with a first user group 406a. Specifically, the first user group 406a includes a relationship with a first application stack 408a represented by a first set of application data objects 410a. To illustrate, one or more user accounts in the first user group 406a are associated with the first set of application data objects 410a based on user access levels in corresponding user data objects indicating that the first user group 406a has access to the first application stack 408a. In response to determining that the user state 404 of the user data object 402 indicates that the user data object 402 is no longer associated with the first application stack 408a, the application authorization system 102 can modify user access levels of the user data object 402 to remove access to the first application stack 408a.

In addition to determining that the user state 404 indicates that the user data object 402 is no longer associated with the first user group 406a, the access review 400 can also allow the application authorization system 102 to determine that the user state 404 indicates that the user data object 402 is associated with the second user group 406b. In particular, as illustrated in FIG. 4A, the application authorization system

102 can determine that the second user group 406b is associated with a second application stack 408b represented by a second set of application data objects 410b. Accordingly, as part of the access review 400, the application authorization system 102 can determine that the user data object 402 should include user access levels for the second set of application data objects 410b based on the association of the user data object 402 with the second user group 406b.

Although FIG. 4A illustrates that the access review 400 indicates a change in the user state 404 from the first user group 406a to the second user group 406b, other access reviews may determine user states indicative of other types of information associated with a user's relationship with an entity. For example, an access review may include the application authorization system 102 determining that a user state of a user data object indicates that an entity recently hired a user, recently fired a user, or changed a role of a user in an organization of the entity. Thus, a user state may indicate that the user data object changes an association with a single group of users or in relation to a specific role, rather than a change relative to a set of user groups (as in FIG. 4A).

FIG. 4B illustrates an example of relationships among data objects and evidence objects in the access review 400 of FIG. 4A. In FIG. 4B, for example, the application authorization system 102 determines the user data object 402, an application data object 412 (e.g., corresponding to the second application stack 408b). Furthermore, as part of the access review 400 or in connection with one or more separate operations, the application authorization system 102 determines an evidence object 414 for tracking evidence associated with one or more relationships between the user data object 402 and the application data object 412.

In one or more embodiments, the application authorization system 102 determines the user data object by determining the user state 404 of the user data object 402 in connection with a user account 417. In particular, as mentioned, the application authorization system 102 determines the user state 404 including user data that indicates a relationship between a corresponding user and an entity. For instance, the user state 404 indicates user group data 418 representing one or more user groups with which the user account 417 of the user data object 402 is associated. Additionally, the user state 404 can indicate user role data 420 representing a role of the user corresponding to the user account 417 relative to the entity. The user state 404 can also include indications of user access levels 422 of the user account 417 for one or more computing software applications.

Additionally, as in one or more embodiments, the application authorization system 102 determines the application data object 412 in connection with a computing software application. For example, in connection with the access review 400 of FIG. 4A, the application authorization system 102 determines an identifier (e.g., "App1") indicating an identity of the computing software application. In one or more embodiments, the application authorization system 102 determines the application data object 412 including one or more groups of users with which the application data object 412 is associated. To illustrate, the application data object 412 represents a set of user groups having access to the computing software application, such as "G1; G10," each indicating a separate group of users. Alternatively, or additionally, the application authorization system 102 determines the application data object 412 including various access levels by which user accounts can access the computing software application.

As illustrated in FIG. 4B, the application authorization system 102 determines the evidence object 414 representing an evidence task corresponding to the access review 400. Specifically, the evidence object 414 includes an identifier of the evidence object 414 (e.g., "ET_1_abc"), which may indicate a specific evidence task or evidence task class to perform one or more actions in connection with evidence collection for the access review 400. In one or more embodiments, the evidence object 414 includes a collection data ("7 Jan. 2022") corresponding to a time in which the application authorization system 102 collected evidence related to application access management for the user data object 402 and the application data object 412.

According to one or more embodiments, the application authorization system 102 can perform the access review 400 by populating data in the access review 400 using linking data. For example, as illustrated in FIG. 4B, the application authorization system 102 determines a linked data record 416 that indicates an association between the user data object 402, the application data object 412, and the evidence object 414. To illustrate, the linked data record 416 includes an identifier (e.g., "AR:ET_1") that ties the various data objects and the evidence object 414 together (e.g., by storing identifiers of each of the data objects and the evidence object 414 with the identifier of the linked data record 416 in a database entry). Additionally, although FIG. 4B illustrates a single user data object 402, evidence object 414, and application data object 412 linked by the linked data record 416, in other embodiments, the application authorization system 102 may determine that a set of different user data objects, evidence objects, and/or application data objects are linked by a linked data record (e.g., forming a new group of users and/or application stack).

As described in more detail below, the application authorization system 102 can also utilize an access management tool (e.g., the access management tool 304 of FIG. 3) to implement changes to one or more user data objects and/or application data objects. For instance, the application authorization system 102 integrates with the third-party user management system 300 or one or more additional computing devices (e.g., additional third-party systems and/or administrator client devices) to modify user access levels of user data objects in connection with an access review. To illustrate, in response to detecting a change to a user state of a user data object, the application authorization system 102 can determine a modification to a user access level for a computing software application based on the access review. In some embodiments, the application authorization system 102 can also modify the user access level of the user data object (e.g., automatically or via one or more administrator client devices) in response to the detected change to the user state.

For example, the application authorization system 102 can have permissions to notify one or more administrator client devices. To illustrate, the application authorization system 102 can automatically or manually send requests to administrator client devices associated with managing user access levels of computing software applications in response to a detected change of a user state of a user data object. Alternatively, the application authorization system 102 can have permissions to implement one or more modifications to user access levels directly (e.g., by accessing one or more files and/or account logins that set the user access levels for the computing software applications).

To illustrate, the application authorization system 102 can leverage an integration (e.g., via an API or installed script/executable) of a third-party computing system to automatically modify the user access levels for the computing software applications without human intervention (e.g., by triggering the modification in response to a detected change in the user state). In one or more embodiments, the term "trigger" refers to a computer-generated signal indicating a change in a user state associated with a user account. As an example, in response to detecting that a user state changes with respect to a particular role (e.g., a corresponding user is terminated from employment), the application authorization system 102 can generate a trigger to modify a user access level for a particular computing software application to which the user account has access. Accordingly, the application authorization system 102 can generate a signal to provide to one or more computing devices to modify the user access level. In some embodiments, the application authorization system 102 generates a trigger including a notification that appears within a client application of an administrator client device. Alternatively, the application authorization system 102 generates a trigger including an API call, a script, or an executable that causes one or more computing devices to change a user access level associated with a user account in connection with a computing software application.

Figure 5:
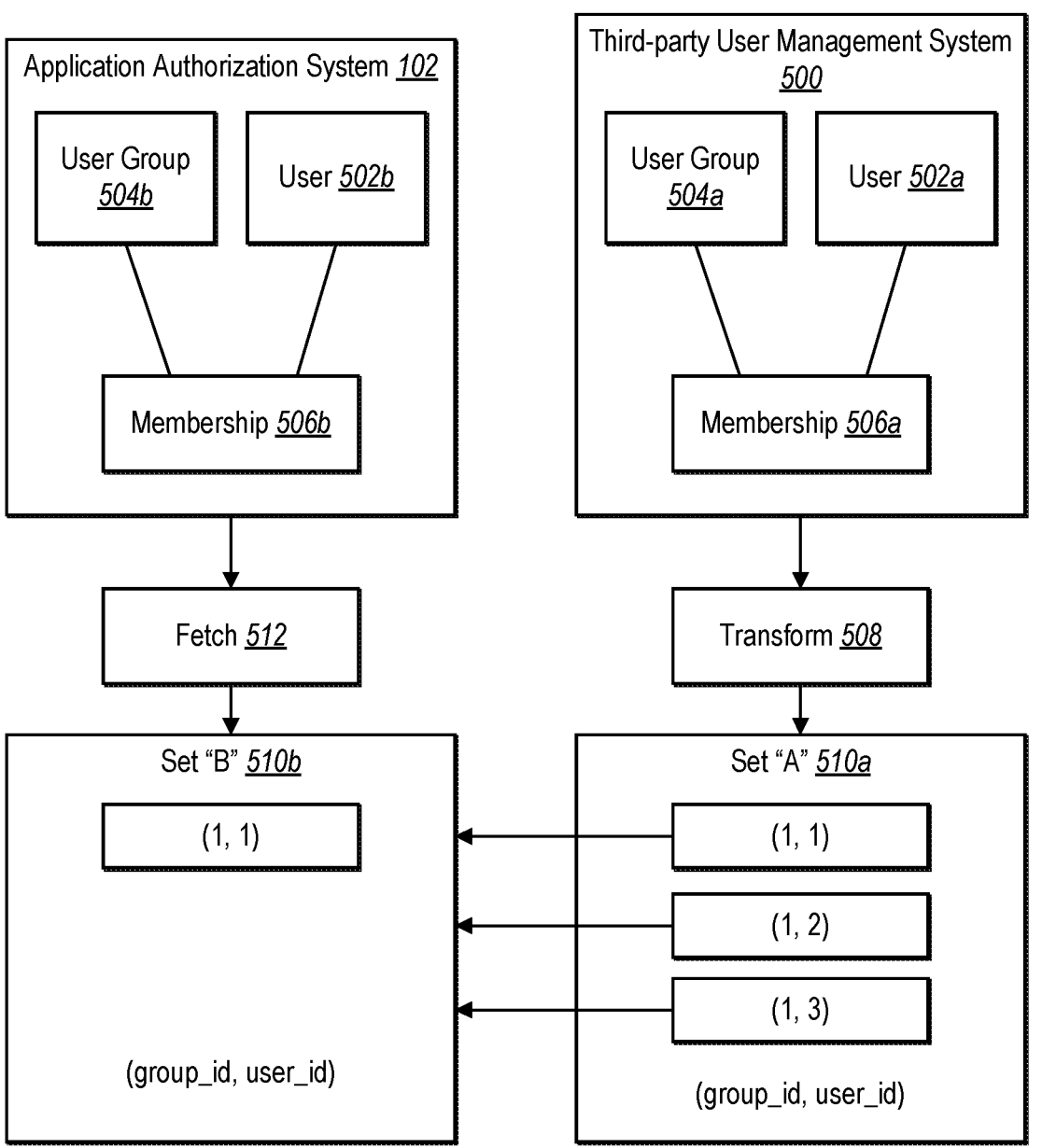
FIG. 5 illustrates an example of the application authorization system synchronizing user data from a third-party user management system in accordance with one or more embodiments.

Additionally, the application authorization system 102 can detect the change in the user state in response to synchronizing or importing data from a third-party system. FIG. 5 illustrates an example of the application authorization system 102 synchronizing/importing information from a third-party user management system 500 in connection with an access review. In particular, the application authorization system 102 accesses data stored by (or otherwise accessible by) the third-party user management system 500 to determine whether the application authorization system 102 is missing any information recently identified/stored by the third-party user management system 500.

As illustrated in FIG. 5, the application authorization system 102 can synchronize data from the third-party user management system 500 in one or more data extraction operations. In particular, the application authorization system 102 extracts relevant information from the third-party user management system 500 according to a regularly executed script or program via an integration with the third-party user management system 500. For example, the application authorization system 102 can perform the extraction operations at specific times of day (e.g., every day at 8:00 am or every day at 8:00 am and 6:00 pm) or at predetermined intervals (e.g., every 4 hours or every 8 hours).

Furthermore, the application authorization system 102 can extract information for use in determining whether a user state changes with respect to an entity. For instance, as illustrated in FIG. 5, the third-party user management system 500 includes information associated with a user 502a, a user group 504a, and a membership 506a of the user 502a with respect to the user group 504a. Because a third-party system may store information in a different manner (e.g., format or structure) than the application authorization system 102, the application authorization system 102 can perform a transform 508 of the extracted data to obtain a first dataset 510a including the relevant information in a specific format, including an identifier of the user, an identifier of the user group, and/or additional information associated with the relationship.

FIG. 5 illustrates that the application authorization system 102 imports the converted data from the first dataset 510a into a second dataset 510b including relevant information associated with the user state associated with a user data object of the user. For example, the application authorization system 102 can perform a fetch 512 to determine corresponding information stored at the application authorization system 102 (e.g., within one or more digital data repositories). To illustrate, the application authorization system 102 can fetch information associated with a user 502*b*, a user group 504*b*, and a membership 506*b* of the user 502*b* with respect to the user group 504*b*. In some embodiments, the information stored in the application authorization system 102 corresponds to the information stored in the third-party user management system 500 (e.g., by referring to the same user, user group, and membership).

In some instances, the fetched information may be different than the transformed information from the third-party user management system 500. Specifically, the application authorization system 102 can determine any data that is different between the first dataset 510*a* and the second dataset 510*b* and copy the missing information from the first dataset 510*a* to the second dataset 510*b*. To illustrate, the application authorization system 102 determines that the third-party user management system 500 updated certain data since the last import operation and updates the second dataset 510*b* to reflect the changed information. Furthermore, the application authorization system 102 can delete any information that appears in the second dataset 510*b* that is not in the first dataset 510*a* (e.g., which may also indicate a change in a user state). The application authorization system 102 can update any changed details in the second dataset 510*b* within the digital data repositories to reflect any change in user state of the user 502*b*.

Although FIG. 5 illustrates the application authorization system 102 importing data from a third-party user management system, the application authorization system 102 can alternatively import data from one or more additional sources. For example, the application authorization system 102 can import user data from a spreadsheet uploaded to the application authorization system 102. In additional embodiments, the application authorization system 102 imports application data from a spreadsheet uploaded to the application authorization system 102. In some embodiments, a single spreadsheet uploaded to the application authorization system 102 can include user data and application data.

Figure 6:
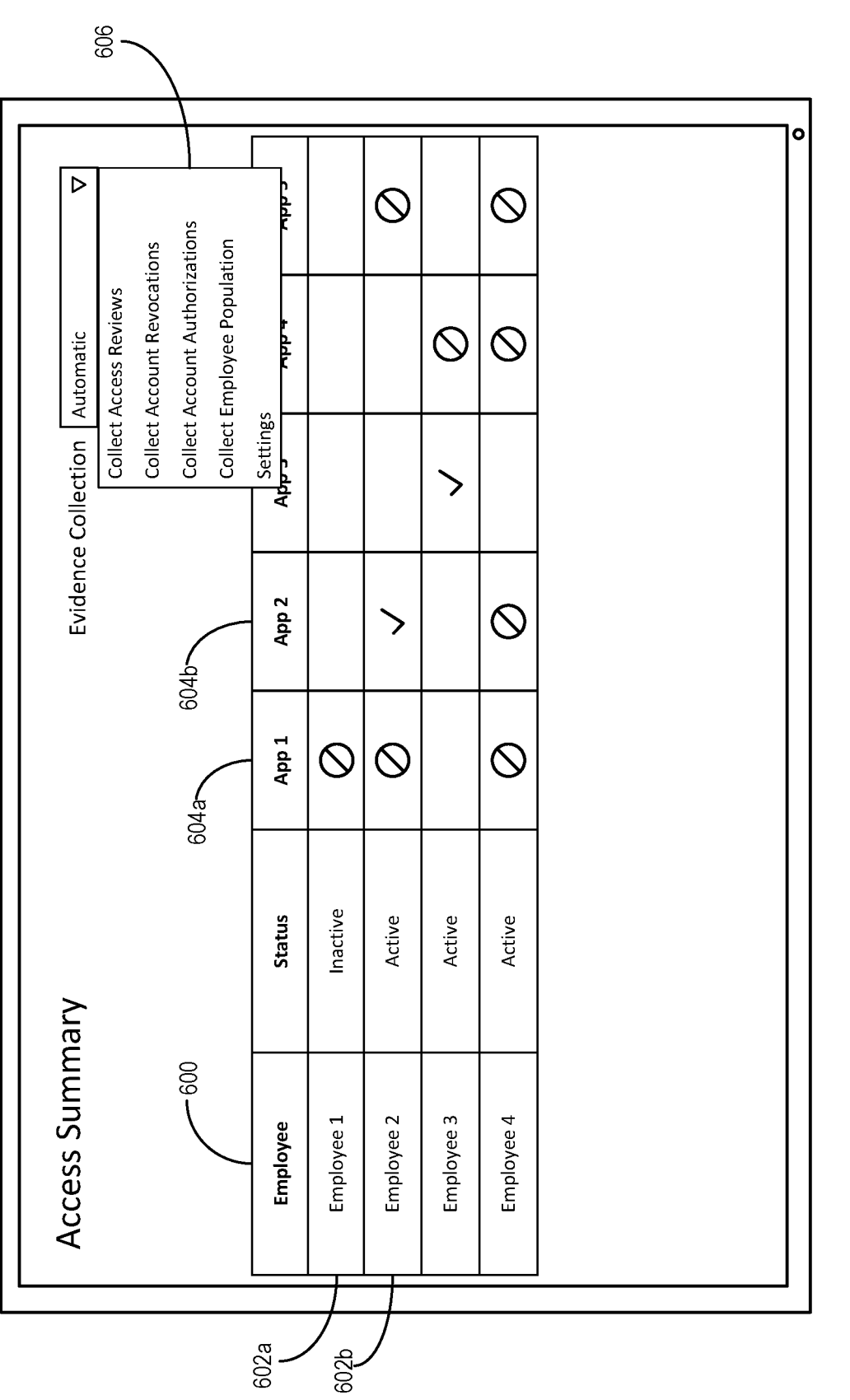
FIG. 6 illustrates an example of a graphical user interface for reviewing an access summary of users associated with an entity for a set of computing software applications in accordance with one or more embodiments.

FIGS. 6-18 illustrate example graphical user interfaces for managing application access in connection with a set of users and computing software applications associated with an entity. For example, FIG. 6 illustrates that a client device includes a client application associated with the application authorization system 102. In particular, the application authorization system 102 provides, for display on the client device via the client application, a graphical user interface including an access summary related to application access for a set of user accounts associated with the entity. To illustrate, the client device displays a list 600 of user accounts associated with the entity, which the application authorization system 102 determines by accessing data from a third-party user management system and/or a computing device associated with the entity. More specifically, the list 600 includes an entry for each user account associated with the entity including a user identifier, a current activity status of a corresponding user account (e.g., active/inactive), and whether the user account has access to each of a set of computing software applications. In some embodiments, the list 600 also includes information indicating whether an access review has recently been performed for each user account.

As mentioned, in one or more embodiments, the application authorization system 102 provides, for display via the client application of the client device, whether a user account has access to a set of computing software applications. For instance, the list 600 includes a first entry 602*a* corresponding to a first user account ("Employee 1"). The first entry 602*a* includes an indicator that the first user account is inactive and has had access revoked for a first computing software application 604*a*. The list 600 further includes a second entry 602*b* corresponding to a second user account ("Employee 2"). The second entry 602*b* includes an indicator that the second user account is active and has access revoked for the first computing software application 604*a* and access authorized for a second computing software application 604*b*. Thus, the list 600 can include user information and computing software application access for a set of user accounts and a set of computing software applications.

In one or more embodiments, the client device also displays one or more tools for initiating an access review associated with the user accounts and computing software applications. FIG. 6 illustrates that the client device displays a dropdown menu 606 including a set of options to initiate evidence collection tasks. Specifically, the dropdown menu 606 includes a set of options for performing operations associated with collecting evidence of access reviews, account revocations, account authorizations, or employee/user populations. Furthermore, the dropdown menu 606 includes an option to manage settings of evidence collection tasks (e.g., by modifying corresponding evidence objects).

Figure 7:
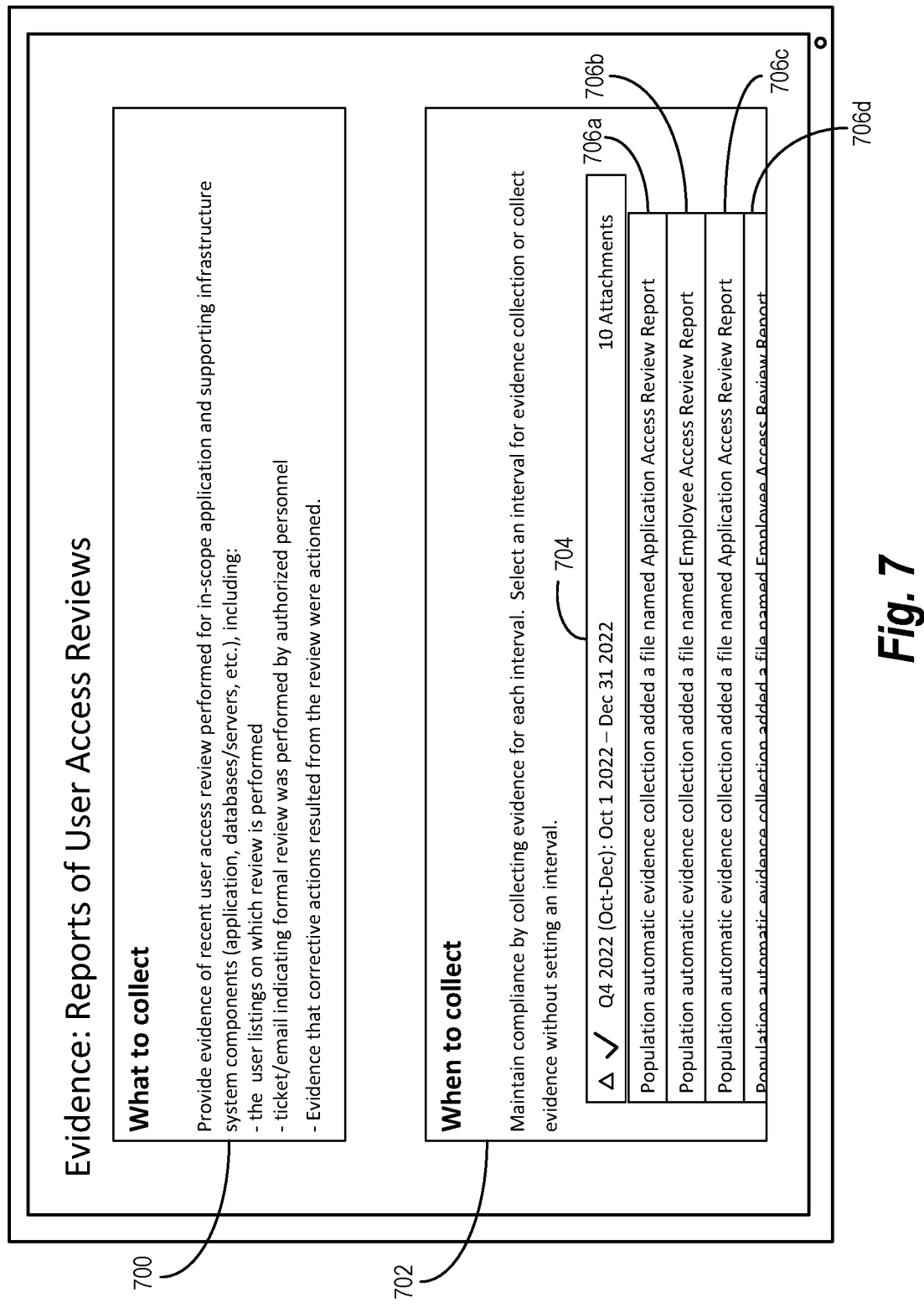
FIG. 7 illustrates an example of a graphical user interface for collecting evidence in connection with access reviews in accordance with one or more embodiments.

FIG. 7 illustrates a client device displaying a graphical user interface associated with performing evidence collection tasks. In particular, as illustrated, the client device displays a first portion 700 indicating what data to collect during one or more evidence collection tasks. For example, the first portion 700 indicates that evidence collected includes data associated with an access review for one or more user accounts in connection with a set of computing software applications associated with an entity. To illustrate, during evidence collection, the application authorization system 102 can determine data indicating which access review is performed, whether a formal review is performed by authorized personnel, or evidence indicating whether any corrective actions result from the review. In some embodiments, the client device displays an option to customize evidence collection for a particular evidence collection task.

Furthermore, as illustrated in FIG. 7, the client device displays a second portion 702 including when to collect evidence for one or more evidence collection tasks. For instance, the second portion 702 indicates that the application authorization system 102 collects evidence according to a specified interval. Alternatively, in some embodiments, the client device also provides an option to collect evidence manually (e.g., in response to an explicit selection to collect evidence for an access review).

In one or more embodiments, the client device displays information associated with previously performed evidence collection tasks. To illustrate, the client device displays an indicator 704 of a previous time period during which the application authorization system performed a set of evidence collection tasks in connection with one or more access reviews for an entity. More specifically, the previous time period corresponds to a previous quarter (e.g., a 3-month period) during which the application authorization system 102 performed one or more evidence collection tasks associated with one or more types of data.

In addition, the client device can display, in response to a selection of the indicator 704, a set of sub-indicators corresponding to a set of separate evidence collection tasks performed during the previous time period and a set of files attached in connection with each evidence collection task. For instance, a first sub-indicator 706a corresponds to a first application access review report, a second sub-indicator 706b corresponds to a first employee access review report, a third sub-indicator 706c corresponds to a second application access review report, and a fourth sub-indicator 706d corresponds to a second employee access review report. In some embodiments, the application authorization system 102 performs a set of the evidence collection tasks in connection with a single access review (e.g., the first application access review report and the first employee access review report corresponds to a first access review).

Additionally, in one or more embodiments, the application authorization system 102 provides a selected report associated with an evidence collection task for display at a client device. For example, FIG. 8 illustrates a user access review report 800 generated in connection with one or more evidence collection tasks for an access review. Specifically, the application authorization system 102 generates the user access review report 800 in response to collecting evidence data associated with a set of user accounts and a set of computing software applications. To illustrate, the application authorization system 102 generates the user access review report 800 based on data corresponding to a set of user data objects, a set of application data objects, and/or one or more evidence objects representing one or more evidence collection tasks.

Furthermore, as illustrated in FIG. 8, the user access review report 800 includes information associated with the user accounts (e.g., identifier, contact information, status), computing software applications to which a particular user account has access (e.g., one computing software application per entry in the user access review report 800), and a review data associated with each entry. In one or more embodiments, the user access review report 800 includes a user access level corresponding to each computing software application, which indicates not only that a user account has access but also a degree of access. To illustrate, the user access review report 800 includes indications of "standard" or "privileged" user access levels for each user account and each corresponding computing software application. In some embodiments, a particular computing software application has more than one type of user access level, while other computing software applications may have more than one user access level.

Figure 9:
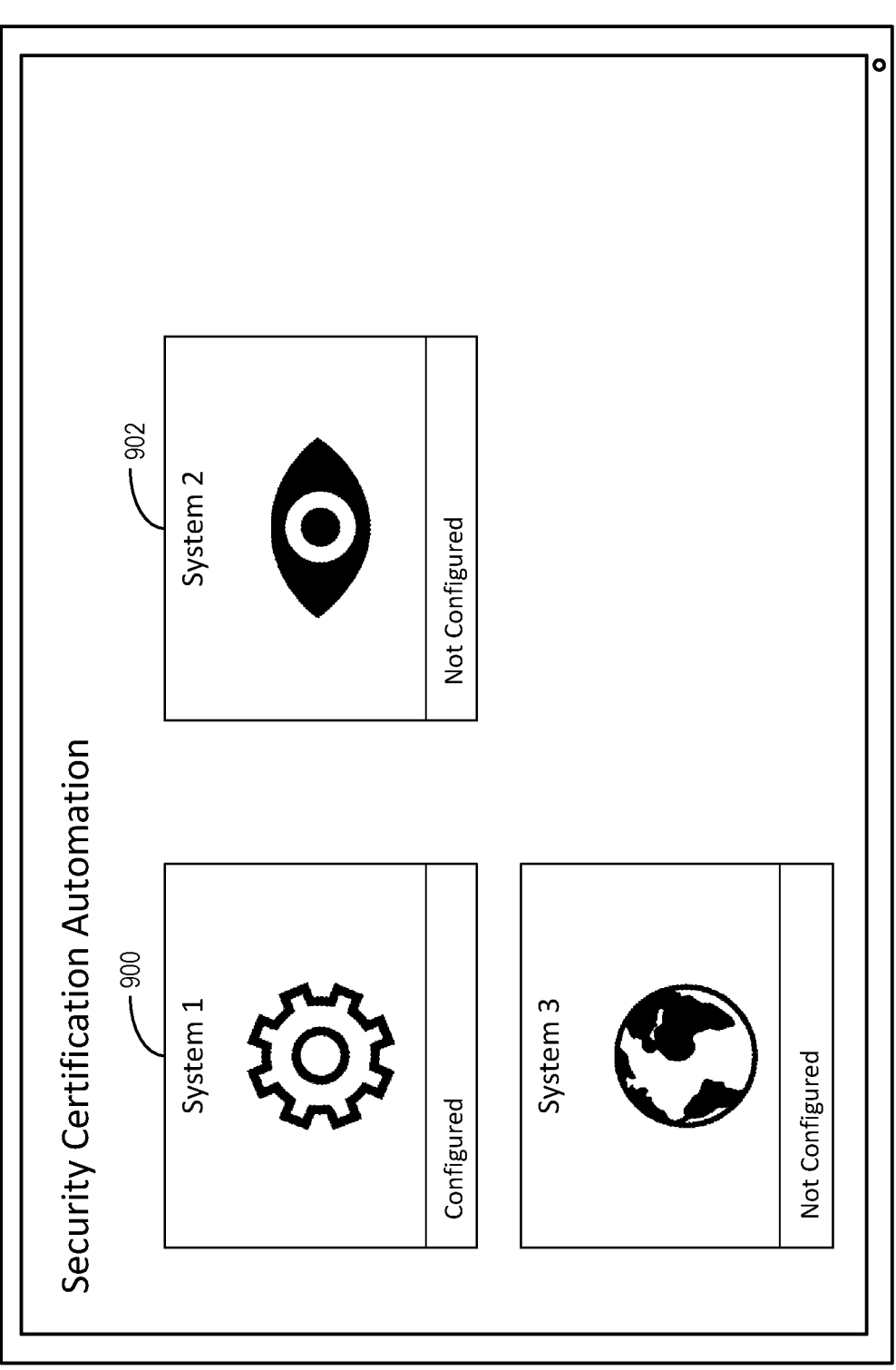
FIG. 9 illustrates an example of a graphical user interface for integrating the application authorization system with one or more third-party user management systems in accordance with one or more embodiments.

According to one or more embodiments, as mentioned, the application authorization system 102 integrates with a third-party user management system to obtain data in connection with an access review. For example, the application authorization system 102 communicates with the third-party user management system via an API or via an executable/script corresponding to the application authorization system 102 stored on computing devices of the third-party user management system. FIG. 9 illustrates a graphical user interface of a client device for displaying interactive options to integrate with one or more third-party user management system. Specifically, the client device displays a first element 900 associated with a first third-party user management system and a second element 902 associated with a second third-party user management system.

In response to a selection of the first element 900, the client device can display settings to configure an integration with a particular third-party user management system. For example, the client device can detect a selection of the first third-party user management system (e.g., via the first element 900) for importing data associated with a set of user accounts. According to one or more embodiments, the third-party user management system includes a software tool for personnel management by which the application authorization system 102 imports relevant information about each user of the entity. As illustrated in FIG. 9, the client device displays whether each third-party user management system is configured for use with the application authorization system 102 (e.g., whether the application authorization system 102 has integrated with the third-party user management system). In some embodiments, the application authorization system 102 integrates with a single third-party user management system as the "source of truth" for user data associated with the entity. Thus, even if the application authorization system 102 is integrated with a set of third-party user management system, the application authorization system 102 utilizes the "source of truth" to detect user state changes for user data objects. Additionally, the application authorization system 102 can also import user data from a spreadsheet or other file uploaded to the application authorization system 102.

FIG. 10 illustrates a client device displaying a graphical user interface for managing application access for a set of computing software applications. In particular, the client device displays a set of computing software applications to which one or more user accounts associated with the entity have access (or should have access). For instance, the client device displays a list 1000 with attributes of computing software applications including status information (e.g., active/inactive), owners/administrators of the computing software applications, review times associated with the computing software applications, and options to manage access to the computing software applications.

As illustrated, the list 1000 includes a separate entry for each application and a set of values corresponding to the different attributes. Additionally, as shown, a single owner may be responsible for a set of different computing software applications. Alternatively, a single computing software application may be owned/administrated by a set of separate owners/administrators. In one or more embodiments, the application authorization system 102 provides access management of the computing software applications in response to a selection of an access management element 1002 for a particular computing software application, causing the client device to display a separate graphical user interface or window to manage user access levels of one or more user accounts for the selected computing software application.

Figure 11:
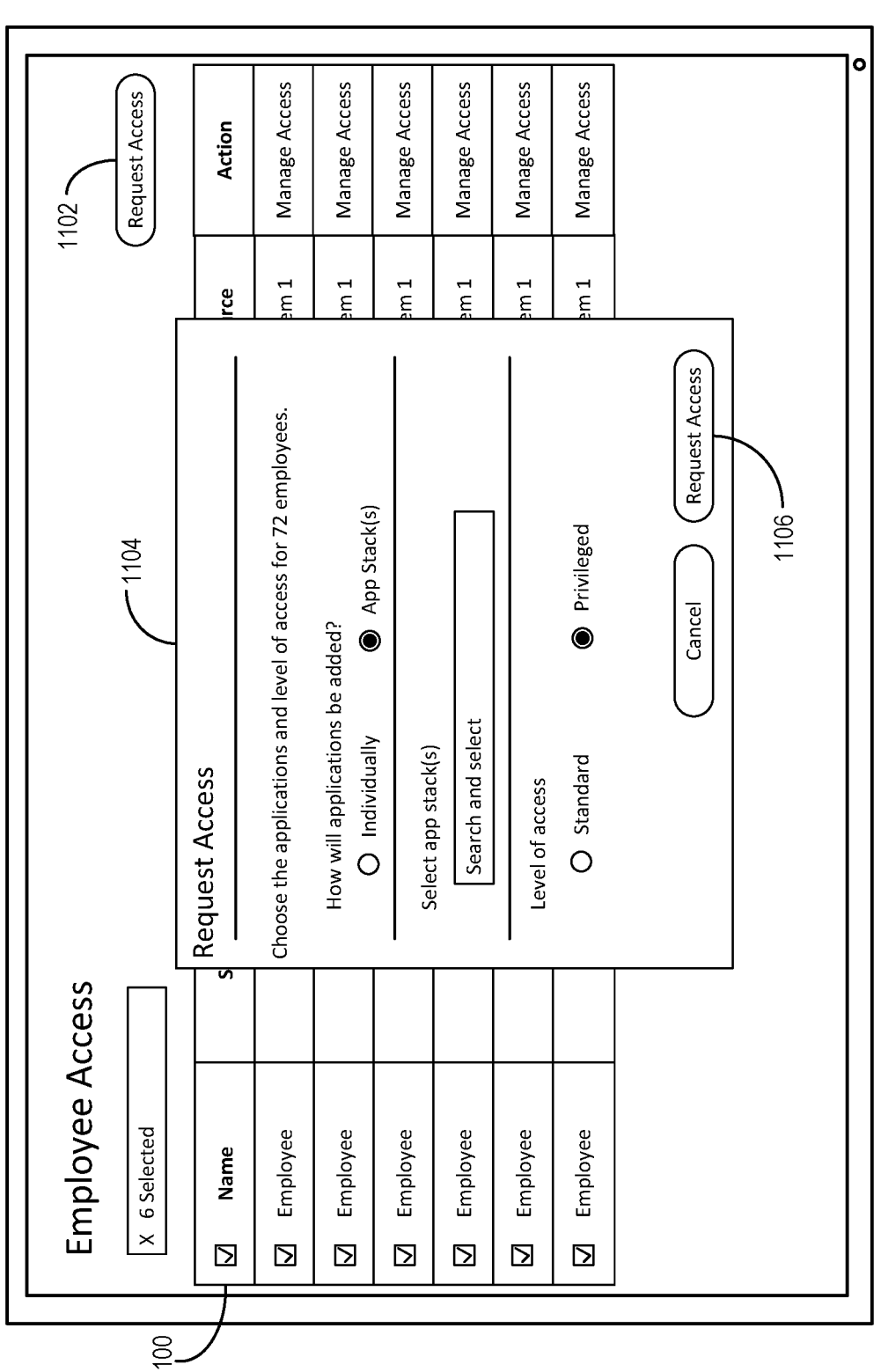
FIG. 11 illustrates an example of a graphical user interface for requesting access to one or more computing software applications for one or more user accounts in accordance with one or more embodiments.

In one or more additional embodiments, the application authorization system 102 also provides access management for one or more selected user accounts. For example, FIG. 11 illustrates a client device displaying a graphical user interface for requesting access to one or more computing software applications for a group of selected user accounts. Specifically, the client device displays a list 1100 of selected user accounts for one or more computing software applications. To illustrate, the client device can detect a selection of a set of user accounts for modifying user access levels relative to an individual computing software application or an application stack (e.g., enterprise applications).

FIG. 11 also illustrates that the client device displays an option 1102 to request access for the selected user accounts. In particular, the application authorization system 102 can manage user access levels for a set of user accounts in a single access management operation. For instance, the client device can display, in response to a selection of the option 1102, an access request interface 1104 to request access to one or more computing software applications for the selected user accounts. According to one or more embodiments, the client device displays the access request interface 1104 including one or more options to indicate whether the request is for individual computing software applications or for an application stack, and what level of access to request (e.g., standard or privileged).

In some embodiments, in response to a selection of an option 1106 to submit an access request, the application authorization system 102 sends the access request to an administrator client device associated with an owner/administrator of the corresponding computing software application. For example, the application authorization system 102 can send a notification for display within an access management application of the computing software application at the administrator client device. The owner/administrator can interact with the notification at the administrator client device and provide the requested user access level to the user account(s).

In alternative embodiments, the application authorization system 102 automatically modifies a user access level in response to an access request. To illustrate, in response to a selection of the option 1106 to submit the access request, the application authorization system 102 communicates with one or more third-party systems or computing devices to modify the user access level. For instance, the application authorization system 102 utilizes the integration with the third-party user management system to modify one or more files that control user access levels for the computing software application. In additional examples, the application authorization system 102 utilizes an integration with an administrator client device or host server associated with the computing software application to modify the user access level associated with a user account for the computing software application. In some embodiments, the application authorization system 102 utilizes a pre-approval from one or more administrators to automatically modify user access levels for users added to specific groups.

Figure 12:
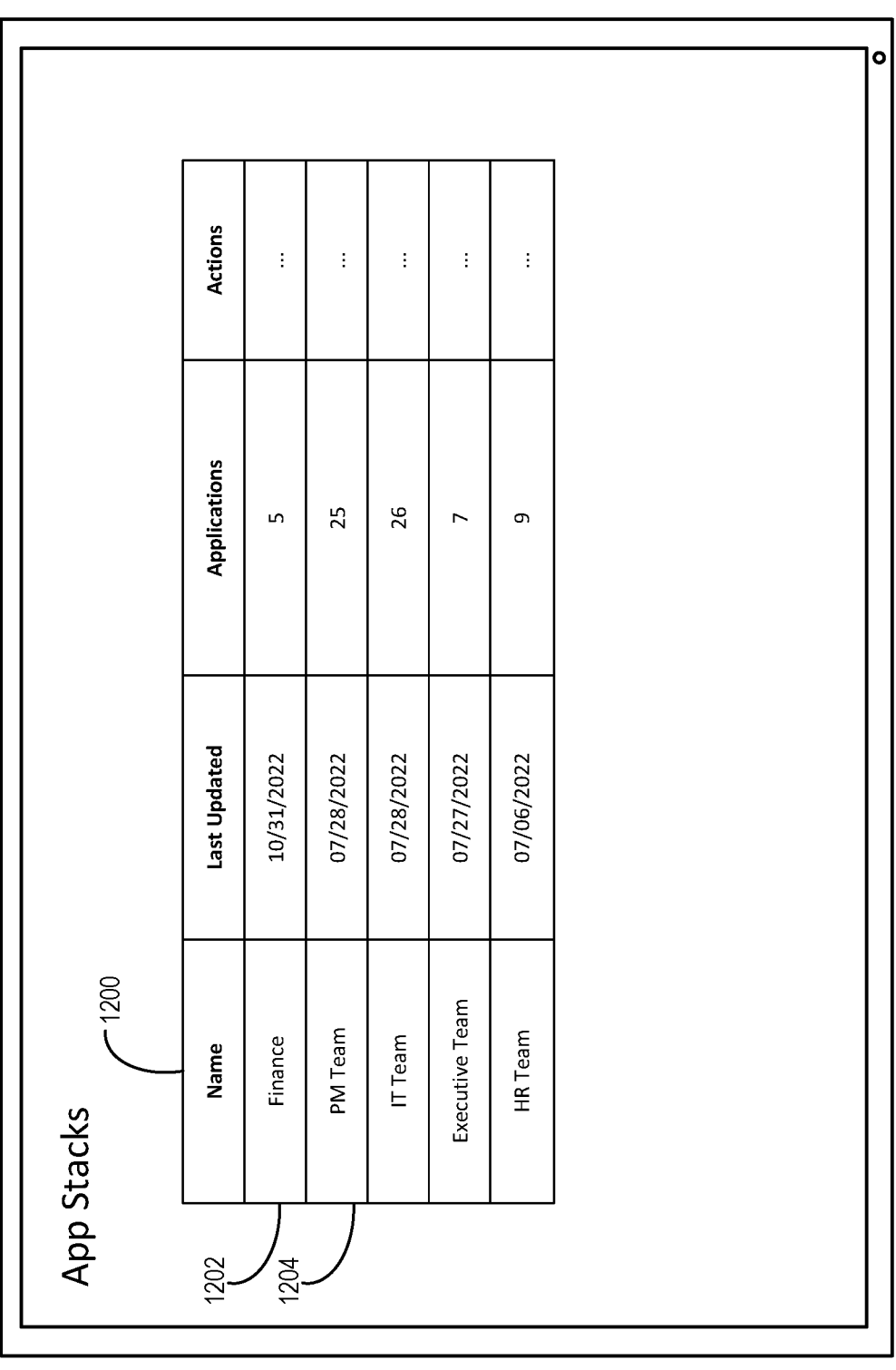
FIG. 12 illustrates an example of a graphical user interface for managing application stacks including computing software applications in accordance with one or more embodiments.

In one or more embodiments, the application authorization system 102 provides management of application stacks in connection with one or more groups of users. For instance, FIG. 12 illustrates a graphical user interface of a client device displaying a set of application stacks corresponding to a set of groups of users. To illustrate, the client device displays a list 1200 of application stacks that the application authorization system 102 has identified in connection with one or more groups of users. Specifically, the application authorization system 102 can determine a first application stack 1202 including a first set of computing software applications which may correspond to a first group of users (e.g., a finance team). Additionally, the application authorization system 102 can determine a second application stack 1204 including a second set of computing software applications which may correspond to a second group of users (e.g., a project management team).

According to one or more embodiments, the application authorization system 102 determines an application stack (or provides a suggestion of an application stack to an administrator client device) based on detected relationships between user data objects and application data objects. For example, the application authorization system 102 can determine that a set of user data objects are associated with the same group of application data objects corresponding to a set of computing software applications. The application authorization system 102 can generate an application stack in response to detecting the relationships, such as in response to detecting user accounts associated with a specific role or team/organization/department. Alternatively, the application authorization system 102 can determine an application stack in response to a request to group a set of computing software applications for a group of users. In additional embodiments, the application authorization system 102 determines application stacks with different numbers of computing software applications.

Figure 13:
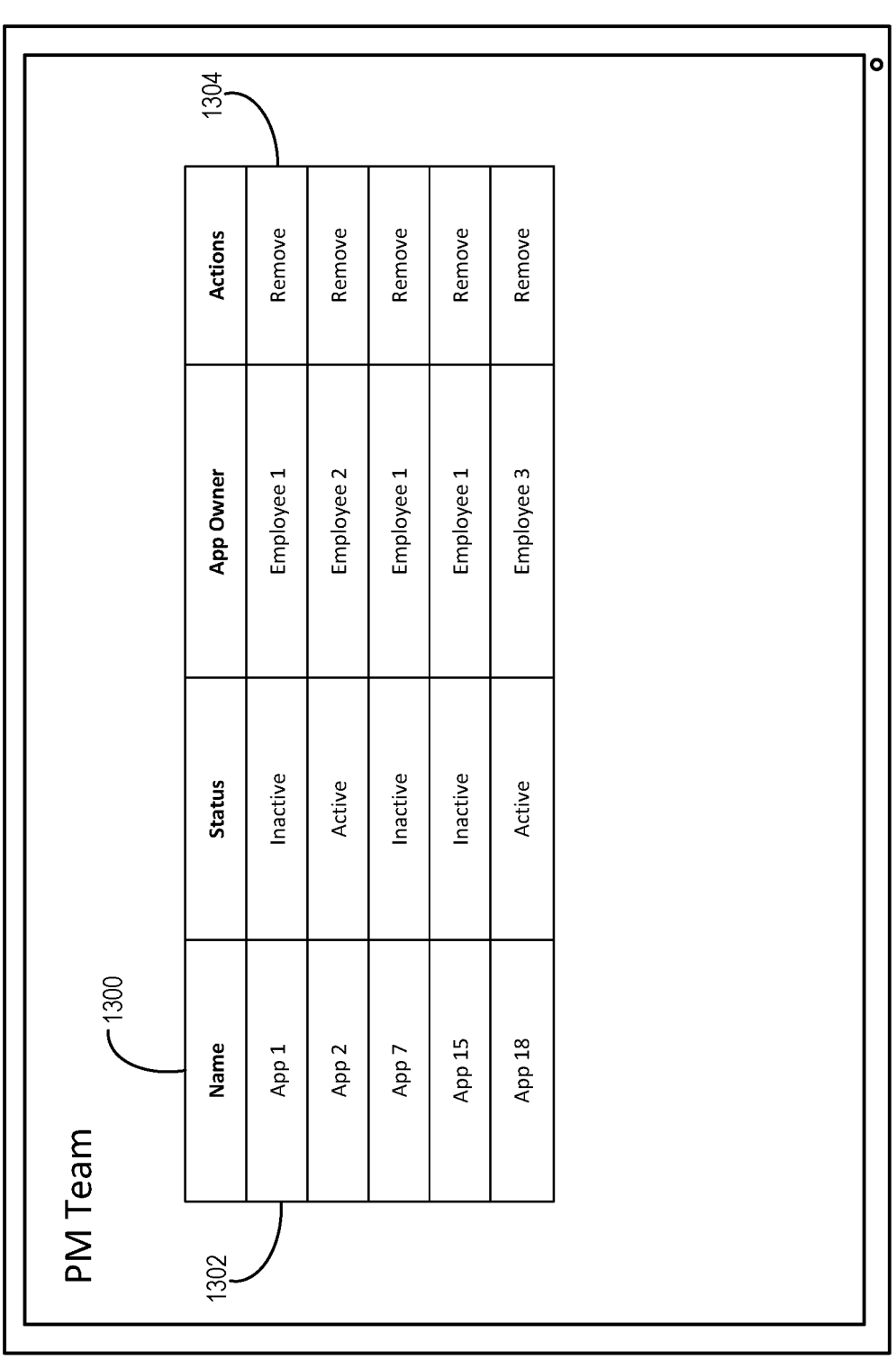
FIG. 13 illustrates an example of a graphical user interface for managing computing software applications associated with a group of users in accordance with one or more embodiments.

FIG. 13 illustrates a graphical user interface of a client device for managing an application stack for a groups of user in connection with an entity. In particular, the client device displays a list 1300 of computing software applications in an application stack associated with a group of users. For example, each user account of the group of users has access to the computing software applications in the list 1300. As mentioned, the application authorization system 102 determines the relationships between the user accounts and the computing software applications based on corresponding user data objects and application data objects.

In additional embodiments, the client device provides tools to remove one or more computing software applications from the application stack. For example, the client device displays a first computing software application 1302 in the list 1300 of computing software applications. Additionally, the client device displays an option 1304 to remove the first computing software application 1302 from the list 1300 of computing software applications. Accordingly, in response to a selection of the option 1304, the client device removes the first computing software application 1302 from the list 1300, and the application authorization system 102 removes the first computing software application 1302 from the application stack. The application authorization system 102 can thus provide tools for one or more users to manage application stacks for various user groups.

Figure 14:
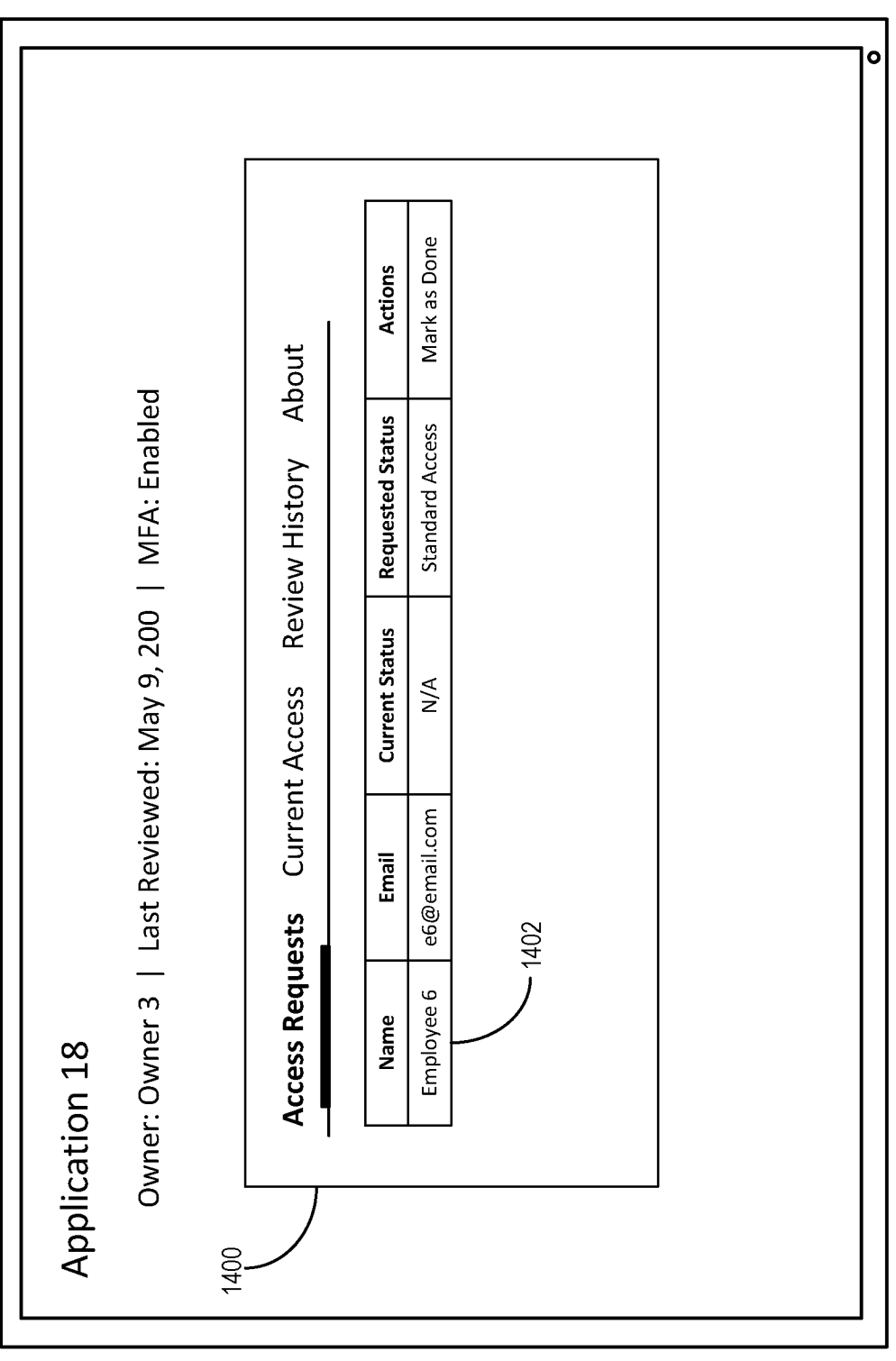
FIGS. 14-15 illustrate examples of graphical user interfaces for managing user access levels for a computing software application in accordance with one or more embodiments.

In addition to managing access to computing software applications in an application stack, the application authorization system 102 can also provide tools for managing access to individual computing software applications. FIG. 14 illustrates a graphical user interface of a client device for managing access (or assisting in managing access) to a single computing software application. To illustrate, the client device displays application data associated with a computing software application including, but not limited to, an owner of the computing software application, a time of last access review for the computing software application, and whether multi-factor authentication is enabled for the computing software application.

Furthermore, the client device displays an access status interface 1400 that includes information about access to the computing software application. For example, the access status interface 1400 can include any pending access requests for one or more user accounts, current access to the computing software application (e.g., by one or more user accounts), an access review history for the computing software application, and additional information associated with the computing software application. In one or more embodiments, the access status interface 1400 includes a first pending access request 1402 to provide access to a user account for the computing software application. The first pending access request 1402 includes identifying information for the user account, a current status of the user account, a requested user access level, and one or more actions to perform in connection with the first pending access request 1402 (e.g., to mark the request as complete based on access being granted by an owner or the application authorization system 102).

Figure 15:
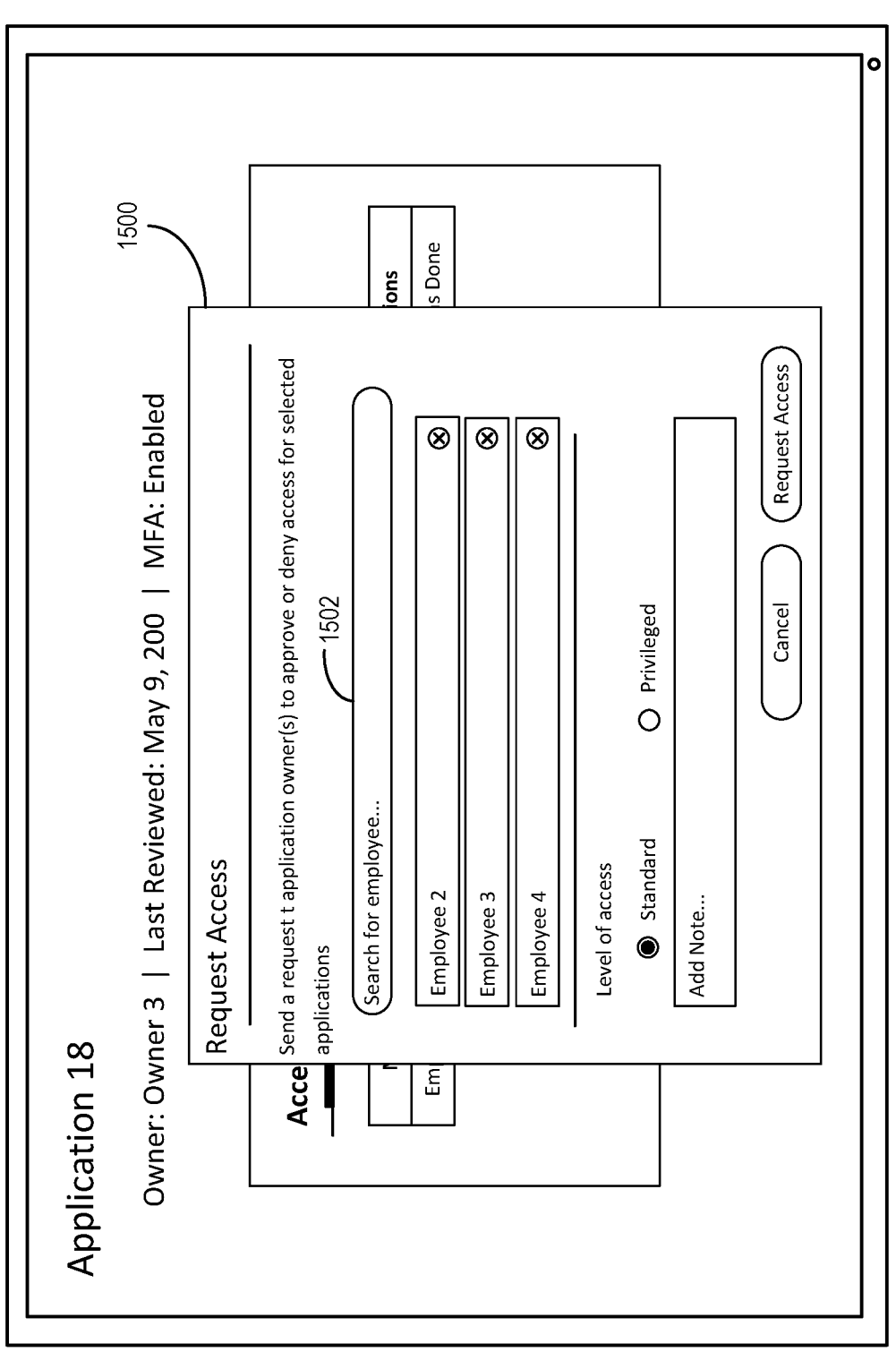

FIG. 15 illustrates a graphical user interface of a client device for managing an access request for a computing software application. For example, as mentioned above with respect to FIG. 14, the application authorization system 102 can assist in managing access to a computing software application. As an example, in response to a selection to request access to the computing software application for one or more user accounts, the client device displays an access request interface 1500 with a set of options for generating an access request in connection with the computing software application. To illustrate, the access request interface 1500 includes a search field 1502 to search for and select one or more user accounts and a level of access to request for the selected user account(s).

In one or more embodiments, the application authorization system 102 provides tools for managing specific groups of users. For example, FIG. 16 illustrates a graphical user interface of a client device for providing user group management. Specifically, the client device displays a list 1600 of user accounts associated with a group of users. To illustrate, the list 1600 includes user accounts that are assigned to a project management team ("PM Team"). Accordingly, as users are added to or removed from the group of users, the application authorization system 102 can update the list 1600 for display at the client device (e.g., by adding or removing corresponding user accounts from the list 1600). In particular, the client device can display an option 1602 to remove a particular user account from the group of users.

Figure 17:
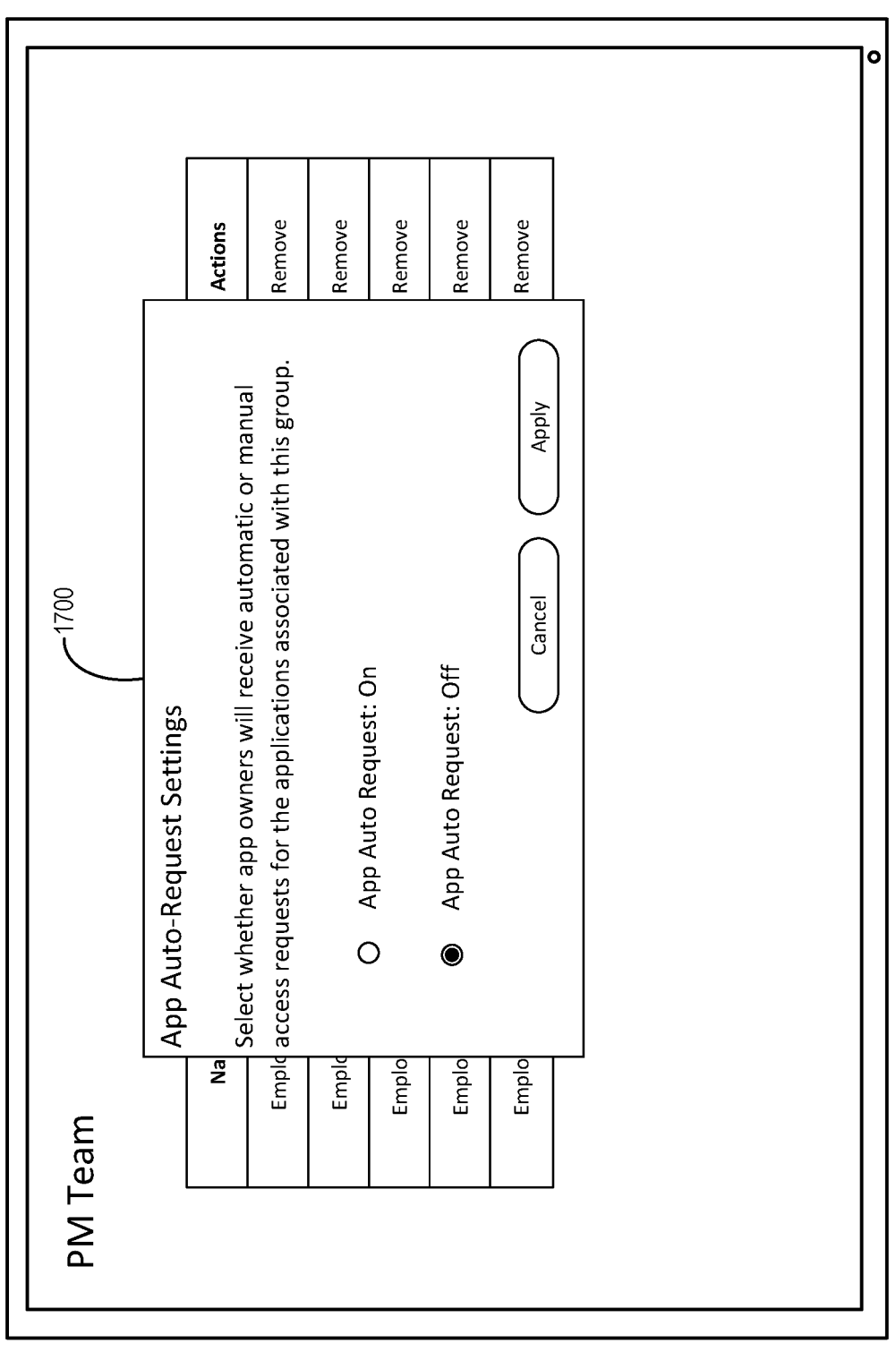
FIG. 17 illustrates an example of a graphical user interface for setting automatic requests for user access levels in accordance with one or more embodiments.

In one or more additional embodiments, the application authorization system 102 provides tools for managing request settings associated with access requests of computing software applications. FIG. 17 illustrates a graphical user interface of a client device for managing auto-request settings associated with access requests. In particular, the application authorization system 102 can provide tools for selecting automatic requests or manual requests in connection with modifying user access levels for one or more computing software applications. To illustrate, the client device displays a settings interface 1700 with an option to turn automatic requests on or off. More specifically, turning automatic requests on causes the application authorization system 102 to automatically submit access requests for user accounts to one or more administrator client devices in response to determining changes to user access levels (e.g., in response to detecting a change in a user state of a user data object with respect to a particular group of users). Alternatively, turning automatic requests off causes the application authorization system 102 to submit access requests for user accounts in response to manual selections to submit the access requests.

Figure 18:
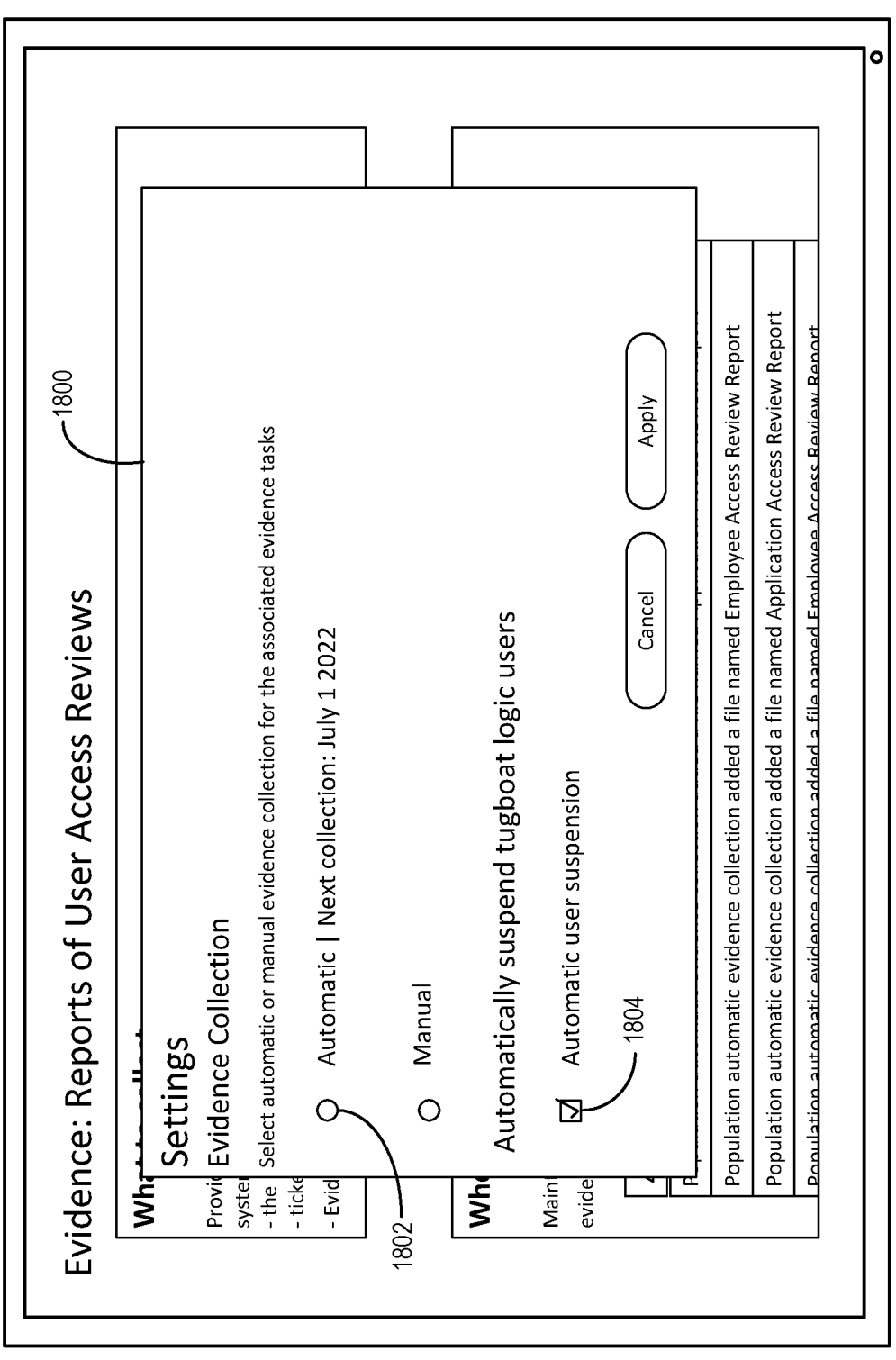
FIG. 18 illustrates an example of a graphical user interface for scheduling evidence collection in connection with user access levels for computing software applications in accordance with one or more embodiments.

As mentioned, in one or more embodiments, the application authorization system 102 performs access reviews by performing one or more evidence collection tasks involving user data objects, application data objects, and corresponding evidence object(s). As part of performing evidence collection tasks, the application authorization system 102 provides one or more evidence collection settings. FIG. 18 illustrates a graphical user interface of a client device for establishing evidence collection settings. Specifically, the client device displays a settings interface 1800 to modify evidence collection settings (e.g., in connection with the graphical user interface of FIG. 7).

For instance, the client device displays, within the settings interface 1800, an option to select from automatic or manual evidence collection. In at least some embodiments, in response to a selection of an option 1802 for automatic evidence collection, the client device also displays a set of options to determine which evidence to collect. To illustrate, the client device displays selectable options to automatically collect evidence for access reviews, account revocations, account authorizations, or user populations. Furthermore, the client device can display an option 1804 to automatically suspend a user account with the application authorization system 102 when a user is terminated with respect to an entity based on a change in the user state of a corresponding user data object (e.g., during onboarding/offboarding or in response to updated information extracted from a third-party user management system).

Figure 19:
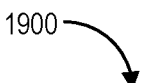
FIG. 19 illustrates an example flowchart of a process for managing a user access level of a user data object for a computing software application according to a user state of the user data object in accordance with one or more embodiments.
Figure 19:
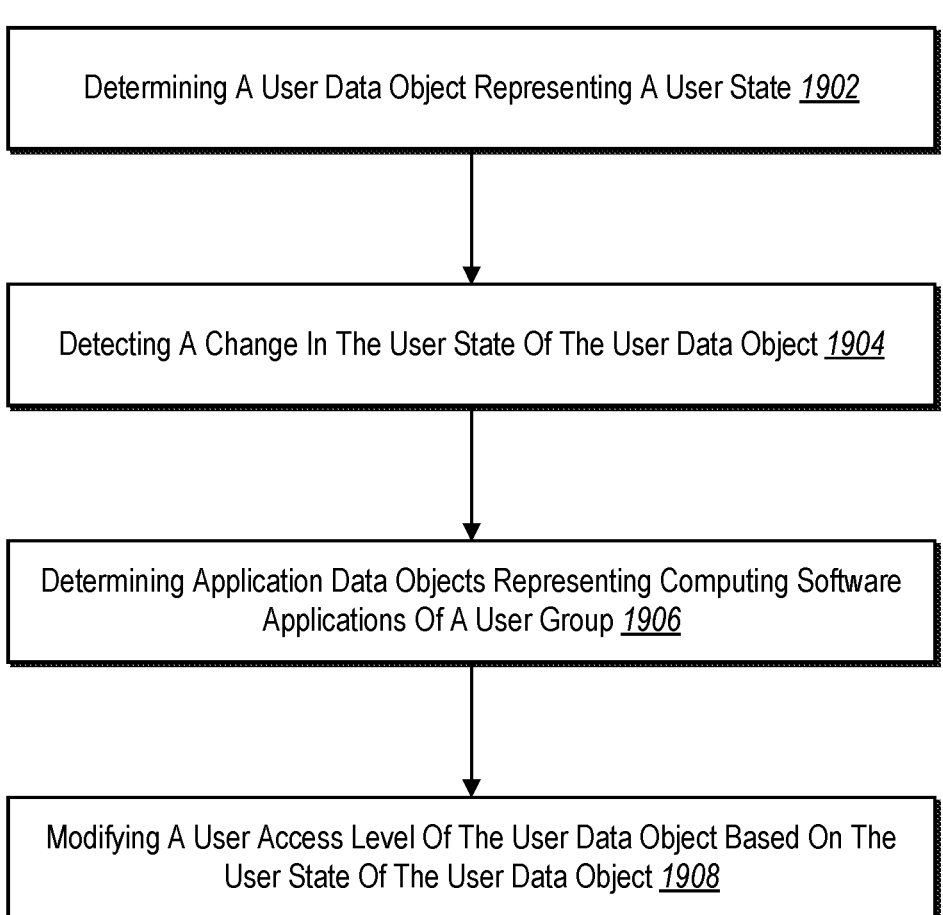

Turning now to FIG. 19, this figure shows a flowchart of a process 1900 of managing a user access level of a user data object for a computing software application according to a user state of the user data object. While FIG. 19 illustrates acts according to one embodiment, alternative embodiments may omit, add to, reorder, and/or modify any of the acts shown in FIG. 19. The acts of FIG. 19 can be performed as part of a method. Alternatively, a non-transitory computer readable medium can comprise instructions, that when executed by processing hardware, cause a computing device to perform the acts of FIG. 19. In still further embodiments, a system can perform the acts of FIG. 19.

As shown, the process 1900 includes an act 1902 of determining a user data object representing a user state. For example, act 1902 involves accessing via an integration with a third-party user management system, a user data object representing a user state in connection with a group of users of an entity. Act 1902 can involve importing, in response to accessing one or more files from the third-party user management system, the user state indicating an association of a user account of the user data object with the group of users of the entity or a role corresponding to the user account.

Act 1902 can involve providing, within a graphical user interface, a first option to import user data from the third-party user management system and a second option to import user data from an uploaded file. Act 1902 can also involve importing, via the integration with the third-party user management system, the user data from the third-party user management system in response to a selection of the first option.

Act 1902 can involve determining, based on the user state, that a user has been added to the group of users of the entity. For example, act 1902 can involve importing, in response to a modification to one or more files at the third-party user management system, the user state indicating that the user account has been added to the group of users of the entity. Act 1902 can involve determining, based on the user state, that a user has been removed from the group of users of the entity. For example, act 1902 can involve importing, in response to a modification to one or more files at the third-party user management system, the user state indicating that the user account has been removed from the group of users of the entity.

For example, act 1902 can involve determining, via the integration with the third-party user management system, that the user state has changed from a first state to a second state indicating the association of the user account of the user data object with the group of users of the entity or the role corresponding to the user account.

Act 1902 can involve receiving a spreadsheet uploaded via a user access interface, the spreadsheet comprising user data for a set of users associated with the entity. Act 1902 can also involve extracting the user state for the user data object from the spreadsheet.

The process 1900 also includes an act 1904 of detecting a change in the user state of the user data object. For example, act 1904 involves detecting, via the integration with a third-party user management system, a change in the user state of the user data object in connection with a group of users of an entity.

Act 1904 can involve determining that the user state has changed in response to a scheduled computing process to access a set of files associated with a set of user data objects at the third-party user management system. Act 1904 can also involve modifying the user data object to indicate that the user state has changed.

Additionally, the process 1900 includes an act 1906 of determining application data objects representing computing software applications of a user group. For example, act 1906 involves determining, from one or more application data objects, one or more computing software applications corresponding to the group of users of the entity. Act 1906 can involve determining a set of application data objects representing a set of computing software applications to which the group of users of an entity have access. Act 1906 can involve determining an application stack comprising a set of computing software applications assigned to the group of users. For example, act 1906 can involve generating the one or more application data objects based on determining an application stack comprising a set of computing software applications assigned to the group of users.

Act 1906 can involve determining, based on a set of user data objects associated with the entity, that a set of users in the group of users have a particular access level for the one or more application data objects. Act 1906 can also involve generating a mapping between the group of users and the one or more computing software applications in response to determining that the users have the particular access level.

The process 1900 can further include an act 1908 of modifying a user access level of the user data object based on the user state of the user data object. For example, act 1908 can involve modifying, based on the user state of the user data object, a user access level of the user data object for the one or more computing software applications corresponding to group of users.

For instance, act 1908 can involve modifying, via integration with the third-party user management system, the user access level of the user data object by authorizing a user account associated with the user data object for the one or more computing software applications. Act 1908 can involve automatically modifying one or more files of one or more computing devices associated with the one or more computing software applications to modify the user access level of the user data object in response to detecting that the user state of the user data object changes.

Act 1908 can involve generating, based on the user state of the user data object, one or more requests to modify a user access level of the user data object for the one or more computing software applications. For example, act 1908 can involve generating a trigger to execute a set of computing instructions to modify the user access level of the user data object in response to a change in the user state of the user data object. Act 1908 can also involve executing the computing instructions to modify the user access level of the user data object in response to detecting that the user state of the user data object changes. Act 1908 can also involve providing the one or more requests to one or more administrator client devices associated with managing user access levels for the one or more computing software applications.

Act 1908 can involve generating a request to authorize the user data object for the one or more computing software applications in response to the user being added to the group of users. For example, act 1908 can involve generating a request to provide, for the user account, authorization to a computing software application of the computing software applications in response to determining that the user account has been added to the group of users. Act 1908 can also involve generating a request to deauthorize the user data object for the one or more computing software applications in response to the user being removed from the group of users. For example, act 1908 can involve generating a request to remove, for the user account, authorization to a computing software application of the computing software applications in response to determining that the user account has been removed from the group of users.

Act 1908 can involve determining a set of additional users having access control for the computing software applications. Act 1908 can involve providing a set of notifications requesting that the additional users provide authorization to the computing software applications for a user account associated with the user data object.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 20:
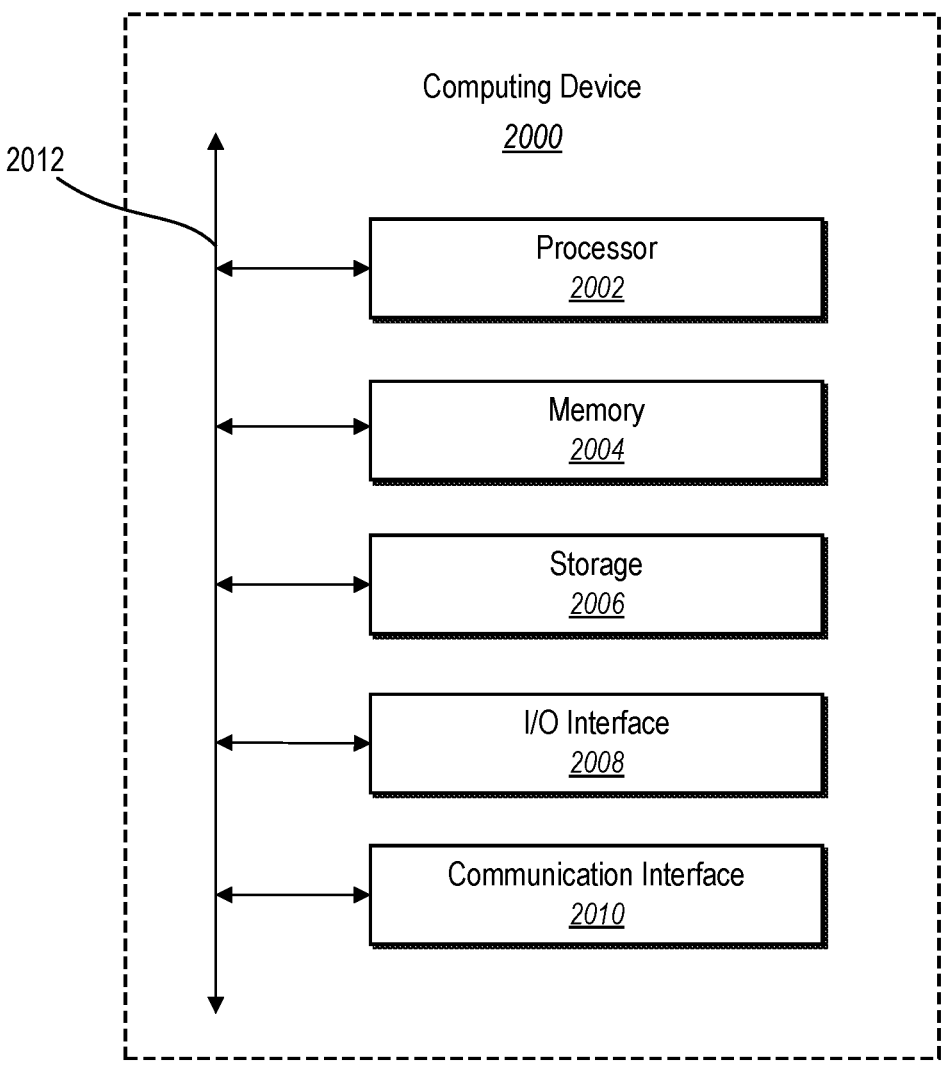
FIG. 20 illustrates an example of a computing device in accordance with one or more embodiments.

FIG. 20 illustrates a block diagram of exemplary computing device 2000 that may be configured to perform one or more of the processes described above. One will appreciate that one or more computing devices such as the computing device 2000 may implement the system(s) of FIG. 1. As shown by FIG. 20, the computing device 2000 can comprise a processor 2002, a memory 2004, a storage device 2006, an I/O interface 2008, and a communication interface 2010, which may be communicatively coupled by way of a communication infrastructure 2012. In certain embodiments, the computing device 2000 can include fewer or more components than those shown in FIG. 20. Components of the computing device 2000 shown in FIG. 20 will now be described in additional detail.

In one or more embodiments, the processor 2002 includes hardware for executing instructions, such as those making up a computer program. As an example, and not by way of limitation, to execute instructions for dynamically modifying workflows, the processor 2002 may retrieve (or fetch) the instructions from an internal register, an internal cache, the memory 2004, or the storage device 2006 and decode and execute them. The memory 2004 may be a volatile or non-volatile memory used for storing data, metadata, and programs for execution by the processor(s). The storage device 2006 includes storage, such as a hard disk, flash disk drive, or other digital storage device, for storing data or instructions for performing the methods described herein.

The I/O interface 2008 allows a user to provide input to, receive output from, and otherwise transfer data to and receive data from computing device 2000. The I/O interface 2008 may include a mouse, a keypad or a keyboard, a touch screen, a camera, an optical scanner, network interface, modem, other known I/O devices or a combination of such I/O interfaces. The I/O interface 2008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 2008 is configured to provide graphical data to a display for presentation to a user. The graphical data may be representative of one or more graphical user interfaces and/or any other graphical content as may serve a particular implementation.

The communication interface 2010 can include hardware, software, or both. In any event, the communication interface 2010 can provide one or more interfaces for communication (such as, for example, packet-based communication) between the computing device 2000 and one or more other computing devices or networks. As an example, and not by way of limitation, the communication interface 2010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 2010 may facilitate communications with various types of wired or wireless networks. The communication interface 2010 may also facilitate communications using various communication protocols. The communication infrastructure 2012 may also include hardware, software, or both that couples components of the computing device 2000 to each other. For example, the communication interface 2010 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
accessing, by processing hardware via an integration with a third-party user management system, a user data object representing a user state in connection with a group of users of an entity;
identifying, by the processing hardware and from one or more application data objects, one or more computing software applications corresponding to the group of users of the entity;
generating, by the processing hardware and based on the user state of the user data object, one or more requests to modify a user access level of the user data object for the one or more computing software applications;
providing, by the processing hardware, the one or more requests to one or more administrator client devices associated with managing user access levels for the one or more computing software applications; and
generating, by the processing hardware, the one or more application data objects based on determining an application stack comprising a plurality of computing software applications assigned to the group of users.

2. The method of claim 1, further comprising determining the user state in the user data object by, at least, importing, in response to accessing one or more files from the third-party user management system, the user state indicating an association of a user account of the user data object with the group of users of the entity or a role corresponding to the user account.

3. The method of claim 2, further comprising determining, via the integration with the third-party user management system, that the user state has changed from a first state to a second state indicating the association of the user account of the user data object with the group of users of the entity or the role corresponding to the user account.

4. The method of claim 1, further comprising determining the user state in the user data object by, at least:
receiving a spreadsheet uploaded via a user access interface, the spreadsheet comprising user data for a plurality of users associated with the entity; and
extracting the user state for the user data object from the spreadsheet.

5. The method of claim 1, wherein:
generating the one or more requests comprises determining a plurality of additional users having access control for the plurality of computing software applications; and
providing the one or more requests comprises providing a plurality of notifications requesting that the plurality of additional users provide authorization to the plurality of computing software applications for a user account associated with the user data object.

6. The method of claim 1, wherein generating the one or more requests comprises:
generating a trigger to execute a plurality of computing instructions to modify the user access level of the user data object in response to a change in the user state of the user data object; and
executing the plurality of computing instructions to modify the user access level of the user data object in response to detecting that the user state of the user data object changes.

7. The method of claim 1, wherein determining the one or more application data objects comprises:
determining, based on a plurality of user data objects associated with the entity, that a plurality of users in the group of users have a particular access level for the one or more application data objects; and
generating a mapping between the group of users and the one or more computing software applications in response to determining that the plurality of users have the particular access level.

8. The method of claim 1, wherein:
determining the user data object comprises determining, based on the user state, that a user has been added to the group of users of the entity; and
generating the one or more requests comprises generating a request to authorize the user data object for the one or more computing software applications in response to the user being added to the group of users.

9. The method of claim 1, wherein:
determining the user data object comprises determining, based on the user state, that a user has been removed from the group of users of the entity; and
generating the one or more requests comprises generating a request to deauthorize the user data object for the one or more computing software applications in response to the user being removed from the group of users.

10. A system comprising:
one or more non-transitory computer readable media comprising a digital data repository; and
processing hardware configured to cause the system to:
determine, via an integration with a third-party user management system, a user data object representing a user state of a user account;

detect, via the integration with a third-party user management system, a change in the user state of the user data object in connection with a group of users of an entity;

determine one or more application data objects representing a plurality of computing software applications to which the group of users of an entity have access;

generate, in response to the change in the user state of the user data object, one or more requests to modify a user access level of the user data object corresponding to the plurality of computing software applications;

provide the one or more requests to one or more administrator client devices associated with managing user access levels for the plurality of computing software applications; and generate the one or more application data objects based on determining an application stack comprising a plurality of computing software applications assigned to the group of users.

11. The system of claim 10, wherein the processing hardware is configured to cause the system to determine the user state in the user data object by, at least, importing, in response to a modification to one or more files at the third-party user management system, the user state indicating that the user account has been added to the group of users of the entity.

12. The system of claim 11, wherein the processing hardware is configured to cause the system to generate the one or more requests by generating a request to provide, for the user account, authorization to a computing software application of the plurality of computing software applications in response to determining that the user account has been added to the group of users.

13. The system of claim 10, wherein the processing hardware is configured to cause the system to determine the user state in the user data object by, at least, importing, in response to a modification to one or more files at the third-party user management system, the user state indicating that the user account has been removed from the group of users of the entity.

14. The system of claim 13, wherein the processing hardware is configured to cause the system to generate the one or more requests by generating a request to remove, for the user account, authorization to a computing software application of the plurality of computing software applications in response to determining that the user account has been removed from the group of users.

15. The system of claim 10, wherein the processing hardware is configured to cause the system to detect the change in the user state by:

determining that the user state has changed in response to a scheduled computing process to access a plurality of files associated with a plurality of user data objects at the third-party user management system; and modifying the user data object to indicate that the user state has changed.

16. The system of claim 10, wherein the processing hardware is configured to cause the system to determine the user data object by:

providing, within a graphical user interface, a first option to import user data from the third-party user management system and a second option to import user data from an uploaded file; and importing, via the integration with the third-party user management system, the user data from the third-party user management system in response to a selection of the first option.

17. A non-transitory computer readable medium comprising instructions that, when executed by processing hardware, cause the processing hardware to:

determine, via an integration with a third-party user management system, a user data object representing a user state in connection with a group of users of an entity;

determine one or more application data objects representing one or more computing software applications corresponding to the group of users of the entity;

modify, based on the user state of the user data object, a user access level of the user data object for the one or more computing software applications corresponding to group of users; and generate the one or more application data objects based on determining an application stack comprising a plurality of computing software applications assigned to the group of users.

18. The non-transitory computer readable medium of claim 17, wherein the instructions that, when executed by the processing hardware, cause the processing hardware to modify the user access level by:

detecting that the user state of the user data object changes with respect to the group of users of the entity; and modifying, via the integration with the third-party user management system, the user access level of the user data object by authorizing a user account associated with the user data object for the one or more computing software applications.

19. The non-transitory computer readable medium of claim 17, wherein the instructions that, when executed by the processing hardware, cause the processing hardware to modify the user access level by:

generating one or more requests to modify the user access level of the user data object corresponding to the one or more computing software applications; and providing the one or more requests to one or more administrator client devices associated with managing user access levels for the one or more computing software applications.

20. The non-transitory computer readable medium of claim 17, wherein the instructions, when executed by the processing hardware, further cause the processing hardware to:

receive a spreadsheet uploaded via a user access interface, the spreadsheet comprising user data for a plurality of users associated with the entity; and extract the user state for the user data object from the spreadsheet.

* * * * *